(12) United States Patent
Santra et al.

(10) Patent No.: US 10,761,187 B2
(45) Date of Patent: Sep. 1, 2020

(54) LIQUID DETECTION USING MILLIMETER-WAVE RADAR SENSOR

(71) Applicant: Infineon Technologies AG, Neubiberg (DE)

(72) Inventors: Avik Santra, Munich (DE); Ashutosh Baheti, Munich (DE); Andreas Dorfner, Munich (DE); Youn Joo Kim, Munich (DE); Raghavendran Vagarappan Ulaganathan, Munich (DE); Thomas Finke, Gilching (DE)

(73) Assignee: INFINEON TECHNOLOGIES AG, Neubiberg (DE)

( * ) Notice: Subject to any disclaimer, the term of this patent is extended or adjusted under 35 U.S.C. 154(b) by 303 days.

(21) Appl. No.: 15/950,438

(22) Filed: Apr. 11, 2018

(65) Prior Publication Data
US 2019/0317190 A1 Oct. 17, 2019

(51) Int. Cl.
*G01S 7/41* (2006.01)
*A47L 9/28* (2006.01)
(Continued)

(52) U.S. Cl.
CPC .............. *G01S 7/41* (2013.01); *A47L 9/2826* (2013.01); *G01S 7/282* (2013.01); *G01S 7/295* (2013.01); *G01S 13/89* (2013.01); *A47L 2201/06* (2013.01)

(58) Field of Classification Search
CPC . G01S 7/41; G01S 7/411; G01S 7/412; A47L 9/28; A47L 9/2805; A47L 9/2826; A47L 2201/06
See application file for complete search history.

(56) References Cited

U.S. PATENT DOCUMENTS

| 4,241,347 A | 12/1980 | Albanese et al. |
| 6,147,572 A | 11/2000 | Kaminski et al. |

(Continued)

FOREIGN PATENT DOCUMENTS

| CN | 1463161 A | 12/2003 |
| CN | 203950036 U | 11/2004 |

(Continued)

OTHER PUBLICATIONS

Infineon, "Using BGT24MTR11 in Low Power Applications", BGT24MTR11, 24 Ghz Radar, RF and Protection Devices, Application Note AN341, Revision: Rev. 1.0, Dec. 2, 2013, 25 pages.

(Continued)

*Primary Examiner* — Peter M Bythrow
(74) *Attorney, Agent, or Firm* — Slater Matsil, LLP

(57) ABSTRACT

A device includes: a millimeter-wave radar sensor circuit configured to generate N virtual channels of sensed data, where N is an integer number greater than one; and a processor configured to: generate a 2D radar image of a surface in a field of view of the millimeter-wave radar sensor circuit based on sensed data from the N virtual channels of sensed data, where the 2D radar image includes azimuth and range information, generate a multi-dimensional data structure based on the 2D radar image using a transform function, compare the multi-dimensional data structure with a reference multi-dimensional data structure, and determine whether liquid is present in the field of view of the millimeter-wave radar sensor circuit based on comparing the multi-dimensional data structure with the reference multi-dimensional data structure.

28 Claims, 9 Drawing Sheets

(51) Int. Cl.
  *G01S 7/282* (2006.01)
  *G01S 7/295* (2006.01)
  *G01S 13/89* (2006.01)

(56) References Cited

U.S. PATENT DOCUMENTS

| | | |
|---|---|---|
| 6,414,631 B1 | 7/2002 | Fujimoto |
| 6,636,174 B2 | 10/2003 | Arikan et al. |
| 7,048,973 B2 | 5/2006 | Sakamoto et al. |
| 7,057,564 B2 | 6/2006 | Tsai et al. |
| 7,171,052 B2 | 1/2007 | Park |
| 7,283,034 B2* | 10/2007 | Nakamura ............ B60R 25/246 340/5.72 |
| 7,317,417 B2 | 1/2008 | Arikan et al. |
| 7,596,241 B2 | 9/2009 | Rittscher et al. |
| 7,692,574 B2 | 4/2010 | Nakagawa |
| 7,873,326 B2 | 1/2011 | Sadr |
| 7,889,147 B2 | 2/2011 | Tam et al. |
| 8,228,382 B2 | 7/2012 | Pattikonda |
| 8,497,805 B2 | 7/2013 | Rofougaran et al. |
| 8,659,369 B2 | 2/2014 | Rofougaran et al. |
| 8,731,502 B2 | 5/2014 | Salle et al. |
| 8,836,596 B2 | 9/2014 | Richards et al. |
| 8,847,814 B2 | 9/2014 | Himmelstoss et al. |
| 8,860,532 B2 | 10/2014 | Gong et al. |
| 8,976,061 B2 | 3/2015 | Chowdhury |
| 9,172,132 B2 | 10/2015 | Kam et al. |
| 9,182,476 B2 | 11/2015 | Wintermantel |
| 9,202,105 B1 | 12/2015 | Wang et al. |
| 9,413,079 B2 | 8/2016 | Kamgaing et al. |
| 9,495,600 B2 | 11/2016 | Heu et al. |
| 2003/0179127 A1 | 9/2003 | Wienand |
| 2004/0238857 A1 | 12/2004 | Beroz et al. |
| 2006/0001572 A1 | 1/2006 | Gaucher et al. |
| 2006/0049995 A1 | 3/2006 | Imaoka et al. |
| 2006/0067456 A1 | 3/2006 | Ku et al. |
| 2007/0210959 A1 | 9/2007 | Herd et al. |
| 2008/0106460 A1 | 5/2008 | Kurtz et al. |
| 2008/0238759 A1 | 10/2008 | Carocari et al. |
| 2008/0291115 A1 | 11/2008 | Doan et al. |
| 2008/0308917 A1 | 12/2008 | Pressel et al. |
| 2009/0073026 A1 | 3/2009 | Nakagawa |
| 2009/0085815 A1 | 4/2009 | Jakab et al. |
| 2009/0153428 A1 | 6/2009 | Rofougaran et al. |
| 2009/0315761 A1 | 12/2009 | Walter et al. |
| 2010/0207805 A1 | 8/2010 | Haworth |
| 2011/0299433 A1 | 12/2011 | Darabi et al. |
| 2012/0087230 A1 | 4/2012 | Guo et al. |
| 2012/0092284 A1 | 4/2012 | Rofougaran et al. |
| 2012/0116231 A1 | 5/2012 | Liao et al. |
| 2012/0195161 A1 | 8/2012 | Little et al. |
| 2012/0206339 A1 | 8/2012 | Dahl |
| 2012/0265486 A1 | 10/2012 | Klofer et al. |
| 2012/0268314 A1 | 10/2012 | Kuwahara et al. |
| 2012/0280900 A1 | 11/2012 | Wang et al. |
| 2013/0027240 A1 | 1/2013 | Chowdhury |
| 2013/0106673 A1 | 5/2013 | McCormack et al. |
| 2014/0028542 A1 | 1/2014 | Lovitt et al. |
| 2014/0070994 A1 | 3/2014 | Schmalenberg et al. |
| 2014/0124004 A1* | 5/2014 | Rosenstein ........ G05D 1/0246 134/18 |
| 2014/0145883 A1 | 5/2014 | Baks et al. |
| 2014/0324888 A1 | 10/2014 | Xie et al. |
| 2015/0009062 A1* | 1/2015 | Herthan ................ G01S 7/415 342/70 |
| 2015/0181840 A1 | 7/2015 | Tupin, Jr. et al. |
| 2015/0185316 A1 | 7/2015 | Rao et al. |
| 2015/0212198 A1 | 7/2015 | Nishio et al. |
| 2015/0226848 A1* | 8/2015 | Park ................... G01S 13/584 342/70 |
| 2015/0243575 A1 | 8/2015 | Strothmann et al. |
| 2015/0277569 A1 | 10/2015 | Sprenger et al. |
| 2015/0325925 A1 | 11/2015 | Kamgaing et al. |
| 2015/0346820 A1 | 12/2015 | Poupyrev et al. |
| 2015/0348821 A1 | 12/2015 | Iwanaga et al. |
| 2015/0364816 A1 | 12/2015 | Murugan et al. |
| 2016/0018511 A1 | 1/2016 | Nayyar et al. |
| 2016/0041617 A1 | 2/2016 | Poupyrev |
| 2016/0041618 A1 | 2/2016 | Poupyrev |
| 2016/0061942 A1 | 3/2016 | Rao et al. |
| 2016/0061947 A1 | 3/2016 | Patole et al. |
| 2016/0066759 A1* | 3/2016 | Langhammer ......... G08C 17/02 15/300.1 |
| 2016/0098089 A1 | 4/2016 | Poupyrev |
| 2016/0103213 A1 | 4/2016 | Ikram et al. |
| 2016/0109566 A1 | 4/2016 | Liu et al. |
| 2016/0118353 A1 | 4/2016 | Ahrens et al. |
| 2016/0135655 A1* | 5/2016 | Ahn ................... G05D 1/0044 134/56 R |
| 2016/0146931 A1 | 5/2016 | Rao et al. |
| 2016/0146933 A1 | 5/2016 | Rao et al. |
| 2016/0187462 A1 | 6/2016 | Altus et al. |
| 2016/0191232 A1 | 6/2016 | Subburaj et al. |
| 2016/0223651 A1 | 8/2016 | Kamo et al. |
| 2016/0240907 A1 | 8/2016 | Haroun |
| 2016/0249133 A1 | 8/2016 | Sorensen |
| 2016/0252607 A1 | 9/2016 | Saboo et al. |
| 2016/0259037 A1 | 9/2016 | Molchanov et al. |
| 2016/0266233 A1 | 9/2016 | Mansour |
| 2016/0269815 A1 | 9/2016 | Liao et al. |
| 2016/0291130 A1 | 10/2016 | Ginsburg et al. |
| 2016/0299215 A1 | 10/2016 | Dandu et al. |
| 2016/0306034 A1 | 10/2016 | Trotta et al. |
| 2016/0320852 A1 | 11/2016 | Poupyrev |
| 2016/0320853 A1 | 11/2016 | Lien et al. |
| 2016/0327633 A1 | 11/2016 | Kumar Y.B. et al. |
| 2016/0334502 A1 | 11/2016 | Ali et al. |
| 2016/0349845 A1 | 12/2016 | Poupyrev et al. |
| 2017/0033062 A1 | 2/2017 | Liu et al. |
| 2017/0045607 A1 | 2/2017 | Bharadwaj et al. |
| 2017/0052618 A1 | 2/2017 | Lee et al. |
| 2017/0054449 A1 | 2/2017 | Mani et al. |
| 2017/0060254 A1 | 3/2017 | Molchanov et al. |
| 2017/0070952 A1 | 3/2017 | Balakrishnan et al. |
| 2017/0074974 A1 | 3/2017 | Rao et al. |
| 2017/0074980 A1 | 3/2017 | Adib et al. |
| 2017/0090014 A1 | 3/2017 | Subburaj et al. |
| 2017/0090015 A1 | 3/2017 | Breen et al. |
| 2017/0115377 A1 | 4/2017 | Giannini et al. |
| 2017/0131395 A1 | 5/2017 | Reynolds et al. |
| 2017/0131721 A1* | 5/2017 | Kwak .................. B25J 9/1664 |
| 2017/0139036 A1 | 5/2017 | Nayyar et al. |
| 2017/0141453 A1 | 5/2017 | Waelde et al. |
| 2017/0170947 A1 | 6/2017 | Yang |
| 2017/0176574 A1 | 6/2017 | Eswaran et al. |
| 2017/0192847 A1 | 7/2017 | Rao et al. |
| 2017/0201019 A1 | 7/2017 | Trotta |
| 2017/0212597 A1 | 7/2017 | Mishra |
| 2017/0364160 A1 | 12/2017 | Malysa et al. |
| 2018/0046255 A1 | 2/2018 | Rothera et al. |
| 2018/0098676 A1* | 4/2018 | Ryu ..................... A47L 9/2857 |
| 2018/0101239 A1 | 4/2018 | Yin et al. |
| 2018/0249872 A1* | 9/2018 | Park ................... G06K 9/00664 |
| 2019/0021568 A1* | 1/2019 | Kim .................... G05D 1/0246 |

FOREIGN PATENT DOCUMENTS

| | | |
|---|---|---|
| CN | 1716695 A | 1/2006 |
| CN | 101490578 A | 7/2009 |
| CN | 101585361 A | 11/2009 |
| CN | 102788969 A | 11/2012 |
| CN | 102967854 A | 3/2013 |
| CN | 103529444 A | 1/2014 |
| DE | 102008054570 A1 | 6/2010 |
| DE | 10211100907 A1 | 1/2012 |
| DE | 102011075725 A1 | 11/2012 |
| DE | 102014118063 A1 | 7/2015 |
| GB | 2247799 A | 3/1992 |
| JP | 2001174539 A | 6/2001 |
| JP | 2004198312 A | 7/2004 |
| JP | 2006234513 A | 9/2006 |
| JP | 2008029025 A | 2/2008 |
| JP | 2008089614 A | 4/2008 |
| JP | 2009069124 A | 4/2009 |

(56) References Cited

FOREIGN PATENT DOCUMENTS

| JP | 2011529181 | A | 12/2011 |
|---|---|---|---|
| JP | 2012112861 | A | 6/2012 |
| JP | 2013521508 | A | 6/2013 |
| JP | 2014055957 | A | 3/2014 |
| KR | 20090063166 | A | 6/2009 |
| KR | 20140082815 | A | 7/2014 |
| WO | 2007060069 | A1 | 5/2007 |
| WO | 2013009473 | A2 | 1/2013 |
| WO | 2016033361 | A1 | 3/2016 |

OTHER PUBLICATIONS

Texas Instruments, "XWR1xxx Power Management Optimizations—Low Cost LC Filter Solution", Application Report SWRA577—Oct. 2017, 19 pages.

Texas Instruments, "Programming Chirp Parameters in TI Radar Devices", Application Report SWRA553—May 2017, 15 pages.

Richards, Mark A., "Fundamentals of Radar Signal Processing," McGraw Hill Electronic Engineering, ISBN: 0-07-144474-2, Jun. 2005, 93 pages.

Chen, Xiaolong et a., "Detection and Extraction of Marine Target with Micromotion via Short-Time Fractional Fourier Transform in Sparse Domain," IEEE International Conference on Signal Processing, Communications and Computing, ICSPCC, Aug. 5-8, 2016, 5 pages.

Chen, Xiaolong et al., "Detection and Extraction of Target with Micromotion in Spiky Sea Clutter via Short-Time Fractional Fourier Transform", IEEE Transactions on Geoscience and Remote Sensing, vol. 52, No. 2, Feb. 2014, pp. 1002-1018.

Chuanhua, Du "Chinese Doctoral Dissertations & Master's Theses Full Text Database (Masters)—Information Science and Technology Series," China National Knowledge Infrastructure, ISSN 1674-0246, CN 11-9144/G, Dec. 16, 2004-Mar. 2015, 14 pages.

Deacon, Peter et al., "Frequency Modulated Continuous Wave (FMCW) Radar," Design Team 6 Technical Lecture, Nov. 9, 2011, 27 pages.

Diederichs, Kailtyn et al., "Wireless Biometric Individual Identification Utilizing Millimeter Waves", IEEE Sensors Council, 3500104, vol. 1, No. 1, Feb. 2017, 4 pages.

Dooring Alert Systems, "Dooring Alert Systems Riders Matter" http:\\dooringalertsystems.com, printed Oct. 4, 2017, 16 pages.

Filippelli, Mario et al., "Respiratory dynamics during laughter," J Appl Physiol, (90), 1441-1446, Apr. 2001, http://jap.physiology.org/content/jap/90/4/1441.full.pdf.

Fox, Ben "The Simple Technique That Could Save Cyclists' Lives," https://www.outsideonline.conn/2115116/simple-technique-could-save-cyclists-lives, Sep. 19, 2016, 6 pages.

Gu, Changzhan et al., "Assessment of Human Respiration Patterns via Noncontact Sensing Using Doppler Multi-Radar System", Sensors Mar. 2015, 15(3), 6383-6398, doi: 10.3390/s150306383, 17 pages.

Guercan, Yalin "Super-resolution Algorithms for Joint Range-Azimuth-Doppler Estimation in Automotive Radars," Technische Universitet Delft, TUDelft University of Technology Challenge the Future, Jan. 25, 2017, 72 pages.

Inac, Ozgur et al., "A Phased Array RFIC with Built-In Self-Test Capabilities," IEEE Transactions on Microwave Theory and Techniques, vol. 60, No. 1, Jan. 2012, 10 pages.

Kizhakkel, V., "Pulsed Radar Target Recognition Based on Micro-Doppler Signatures Using Wavelet Analysis", A Thesis, Graduate Program in Electrical and Computer Engineering, Ohio State University, Jan. 2013-May 2013, 18 pages.

Kuehnke, Lutz, "Phased Array Calibration Procedures Based on Measured Element Patterns," 2001 Eleventh International Conference on Antennas and Propagation, IEEE Conf., Publ. No. 480, Apr. 17-20, 2001, 4 pages.

Lim, Soo-Chul et al., "Expansion of Smartwatch Touch Interface from Touchscreen to Around Device Interface Using Infrared Line Image Sensors," Sensors, ISSN 1424-8220, vol. 15, 16642-16653, doi:10.3390/s150716642, www.mdpi.com/journal/sensors, Jul. 15, 2009, 12 pages.

Lin, Jau-Jr et al., "Design of an FMCW radar baseband signal processing system for automotive application," SpringerPlus a SpringerOpen Journal, (2016) 5:42, http://creativecommons.org/licenses/by/4.0/, DOI 10.1186/s40064-015-1583-5; Jan. 2016, 16 pages.

Microwave Journal Frequency Matters, "Single-Chip 24 GHz Radar Front End," Infineon Technologies AG, www.microwavejournal.com/articles/print/21553-single-chip-24-ghz-radar-front-end, Feb. 13, 2014, 2 pages.

Simon, W., et al., "Highly Integrated KA-Band Tx Frontend Module Including 8x8 Antenna Array," IMST GmbH, Germany, Asia Pacific Microwave Conference, Dec. 7-10, 2009, 63 pages.

Suleymanov, Suleyman "Design and Implementation of an FMCW Radar Signal Processing Module for Automotive Applications," Master Thesis, University of Twente, Aug. 31, 2016, 61 pages.

Thayananthan, T. et al., "Intelligent target recognition using micro-doppler radar signatures," Defence R&D Canada, Radar Sensor Technology III, Proc. of SPIE, vol. 7308, 730817, Dec. 9, 2009, 11 pages.

Thayaparan, T. et al. "Micro-Doppler Radar Signatures for Intelligent Target Recognition," Defence Research and Development Canada, Technical Memorandum, DRDC Ottawa TM 2004-170, Sep. 2004, 73 pages.

Wilder, Carol N., et al., "Respiratory patterns in infant cry," Canada Journal of Speech, Human Communication Winter, 1974-75, http://cjslpa.ca/files/1974_HumComm_Vol_01/No_03_2-60/Wilder_Baken_HumComm_1974.pdf, pp. 18-34.

Xin, Qin et al., "Signal Processing for Digital Beamforming FMCW SAR," Hindawi Publishing Corporation, Mathematical Problems in Engineering, vol. 2014, Article ID 859890, http://dx.doi.org/10.1155/2014/859890, 11 pages.

Schroff, Florian et al., "FaceNet: A Unified Embedding for Face Recognition and Clustering," CVF, CVPR2015, IEEE Computer Society Conference on Computer Vision and Pattern Recognition; Mar. 12, 2015, pp. 815-823.

\* cited by examiner

Top View

US 10,761,187 B2

LIQUID DETECTION USING MILLIMETER-WAVE RADAR SENSOR

TECHNICAL FIELD

The present invention relates generally to an electronic system and method, and, in particular embodiments, to liquid detection using a millimeter-wave radar sensor.

BACKGROUND

Liquid detection sensors are capable of detecting the presence of liquid in a medium. Liquid detection sensors typically operate by detecting a change of a property of a portion of the liquid detection sensor that is designed to change in the presence of liquid, such as water. For example, some electronic devices include small stickers that are designed to change color (e.g., from white to red) when the sticker is in contact with water.

Electronic liquid detection sensors conventionally rely on the change in conductivity of a medium to detect the presence of water or other liquids. For example, an electronic liquid detection sensor may include two terminals spaced apart and configured to conduct a current. During normal operation, since there is no electrical conduction path between the two terminals, no current flows between the two terminals during normal operation. When water is present between the two terminals, the water creates an electrical path that allows the flow of current between the two terminals. Therefore, the liquid detection sensor can sense the presence of a liquid between the two terminals when the current flowing through the terminals is greater than a predefined threshold. The electronic liquid detection sensor may, for example, trigger an alarm to alert a user of the presence of water when the current flowing through the two terminals is greater than the predefined threshold.

Conventional electronic liquid detection sensors, therefore, are capable of detecting the presence of liquid when at least a portion of the liquid detection sensor is in contact with the liquid.

SUMMARY

In accordance with an embodiment, a device includes: a millimeter-wave radar sensor circuit configured to generate N virtual channels of sensed data, where N is an integer number greater than one; and a processor configured to: generate a 2D radar image of a surface in a field of view of the millimeter-wave radar sensor circuit based on sensed data from the N virtual channels of sensed data, where the 2D radar image includes azimuth and range information, generate a multi-dimensional data structure based on the 2D radar image using a transform function, compare the multi-dimensional data structure with a reference multi-dimensional data structure, and determine whether liquid is present in the field of view of the millimeter-wave radar sensor circuit based on comparing the multi-dimensional data structure with the reference multi-dimensional data structure.

In accordance with an embodiment, a method for detecting a liquid from a moving vehicle includes: generating a 2D radar image of a surface in a field of view of a millimeter-wave radar sensor circuit based on sensed data from N virtual channels generated by the millimeter-wave radar sensor circuit; generating a multi-dimensional data structure based on the 2D radar image using a transform function; comparing the multi-dimensional data structure with a reference multi-dimensional data structure; and determining whether liquid is present in the field of view of the millimeter-wave radar sensor circuit based on comparing the multi-dimensional data structure with the reference multi-dimensional data structure.

In accordance with an embodiment, a vacuum cleaner robot includes: a millimeter-wave radar sensor circuit configured to generate N virtual channels of sensed data, where N is an integer number greater than one; and a processor configured to: generate a 2D radar image of a surface in a field of view of the millimeter-wave radar sensor circuit based on sensed data from the N virtual channels of sensed data, where the 2D radar image includes azimuth and range information, generate a multi-dimensional data structure based on the 2D radar image using a transform function, compare the multi-dimensional data structure with a reference multi-dimensional data structure, and determine whether liquid is present in the field of view of the millimeter-wave radar sensor circuit based on comparing the multi-dimensional data structure with the reference multi-dimensional data structure

BRIEF DESCRIPTION OF THE DRAWINGS

For a more complete understanding of the present invention, and the advantages thereof, reference is now made to the following descriptions taken in conjunction with the accompanying drawings, in which.

Figure 1:
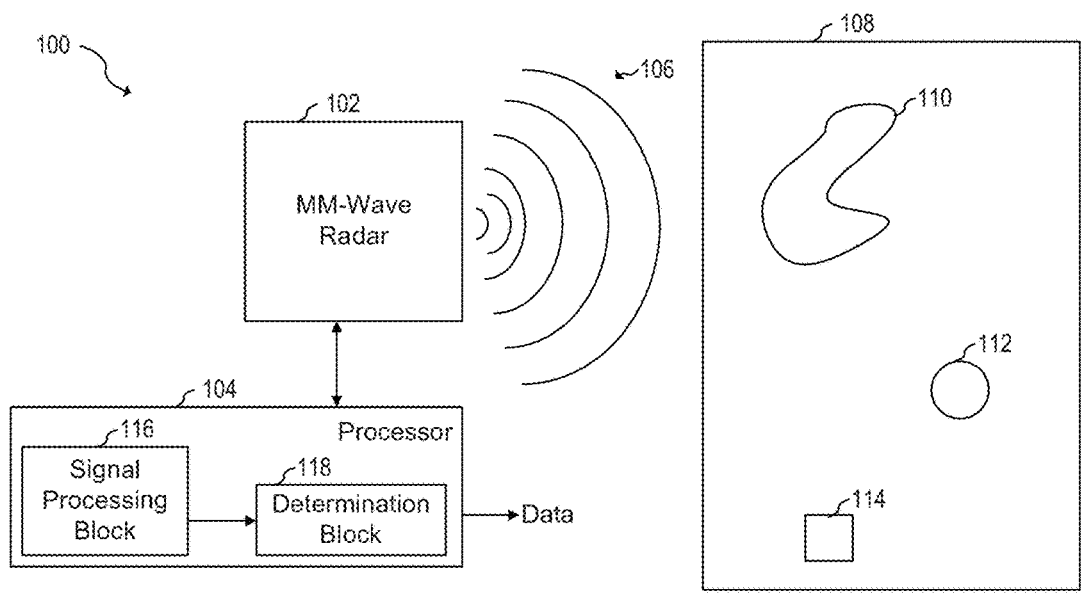
FIG. 1 shows a radar system, according an embodiment of the present invention.

Corresponding numerals and symbols in different figures generally refer to corresponding parts unless otherwise indicated. The figures are drawn to clearly illustrate the relevant aspects of the preferred embodiments and are not necessarily drawn to scale. To more clearly illustrate certain embodiments, a letter indicating variations of the same structure, material, or process step may follow a figure number.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The description below illustrates the various specific details to provide an in-depth understanding of several example embodiments according to the description. The embodiments may be obtained without one or more of the specific details, or with other methods, components, materials and the like. In other cases, known structures, materials or operations are not shown or described in detail so as not to obscure the different aspects of the embodiments. References to "an embodiment" in this description indicate that a particular configuration, structure or feature described in relation to the embodiment is included in at least one embodiment. Consequently, phrases such as "in one embodiment" that may appear at different points of the present description do not necessarily refer exactly to the same embodiment. Furthermore, specific formations, structures or features may be combined in any appropriate manner in one or more embodiments.

The present invention will be described with respect to embodiments in a specific context, a system and method for detecting liquids, such as water, by using a millimeter-wave radar. Using a millimeter-wave radar for liquid detection allows for the detection of liquids in applications that are not in contact with the liquid. In one embodiment, an array of radar sensors is used to form a two-dimensional image of a surface that is moving with respect to the radar sensor. Embodiments can be directed toward such applications as robotic vacuum cleaners, conveyer belt monitoring systems, and other types of systems that are sensitive to the presence of liquid. Advantages of such embodiments include the ability to detect liquids in unknown surfaces. Additional advantages include the detection of liquids in surfaces that are moving with respect to the millimeter-wave radar at various speeds.

In an embodiment of the present invention, a millimeter-wave radar determines whether liquid is present in a field of view of the millimeter-wave radar by generating a 2D image and comparing the 2D image with one or more reference images. The 2D image includes azimuth and depth information of the field of view. A normalization step is performed to compensate for velocity and vibration motions of the vacuum cleaner robot before comparing the 2D image with the one or more references. The one or more reference images are generated using artificial intelligence (AI) algorithms.

In an embodiment, a millimeter-wave radar may be used to detect moving and static objects in the field of view of the millimeter-wave radar, and distinguish liquids from other objects in the field of view. For example, FIG. 1 shows radar system 100, according an embodiment of the present invention. Radar system 100 includes millimeter-wave radar 102 and processor 104.

During normal operation, millimeter-wave radar 102 transmits a plurality of radiation pulses 106, such as chirps, to scene 108. The transmitted radiation pulses 106 are reflected in objects of scene 108. The reflected radiation pulses (not shown in FIG. 1), which are also referred to as the echo signal, are detected by millimeter-wave radar 102 and processed by processor 104 to, for example, detect liquids.

The objects in scene 108 may include liquids 110, such as water, moving objects 112 and static objects 114. Other objects may also be present in scene 108.

Processor 104 analyses the echo data using signal processing block 116 to identify objects in the field of view of millimeter-wave radar 102. For example, signal processing block 116 may use a range Fast Fourier Transform (FFT) to identify range bins in which objects are located.

Processor 104 uses determination block 118 to determine whether any of the identified objects in the field of view of millimeter-wave radar 102 is a liquid. For example, in some embodiments, determination block 118 compares the processed echo data with one or more signatures (or a database of signatures) to determine whether the identified objects is a liquid. Processor 104 may generate a data signal that indicates whether a liquid has been detected in the field of view of millimeter-wave radar 102.

Processor 104 may be implemented as a general purpose processor, controller or digital signal processor (DSP). In some embodiments, processor 104 may be implemented as a custom application specific integrated circuit (ASIC). In some embodiments, processor 104 includes a plurality of processors, each having one or more processing cores. Alternatively, each embodiment function may be implemented using dedicated logic. In other embodiments, processor 104 includes a single processor having one or more processing cores.

Millimeter-wave radar 102 includes a millimeter-wave radar sensor circuit and one or more antennas (not shows). For example, the millimeter-wave radar sensor circuit may be implemented using a two-dimensional millimeter-wave phase-array radar that transmits and receives signals in the 20 GHz to 122 GHz range. Alternatively, frequencies outside of this range may also be used. Some embodiments may include a single millimeter-wave radar sensor circuit. Other embodiments use a plurality of millimeter-wave radar sensor circuits, the data of which are gathered and processed by processor 104, which may be implemented as a centralized processing device.

In some embodiments, millimeter-wave radar 102 includes a uniform linear array antenna. The echo signals received are filtered and amplified using band-pass filter (BPFs), low-pass filter (LPFs), mixers, low-noise amplifier (LNAs), and intermediate frequency (IF) amplifiers in ways known in the art. The echo signals are then digitized using one or more analog-to-digital converters (ADCs) for further processing. Other implementations are also possible.

Figure 2:
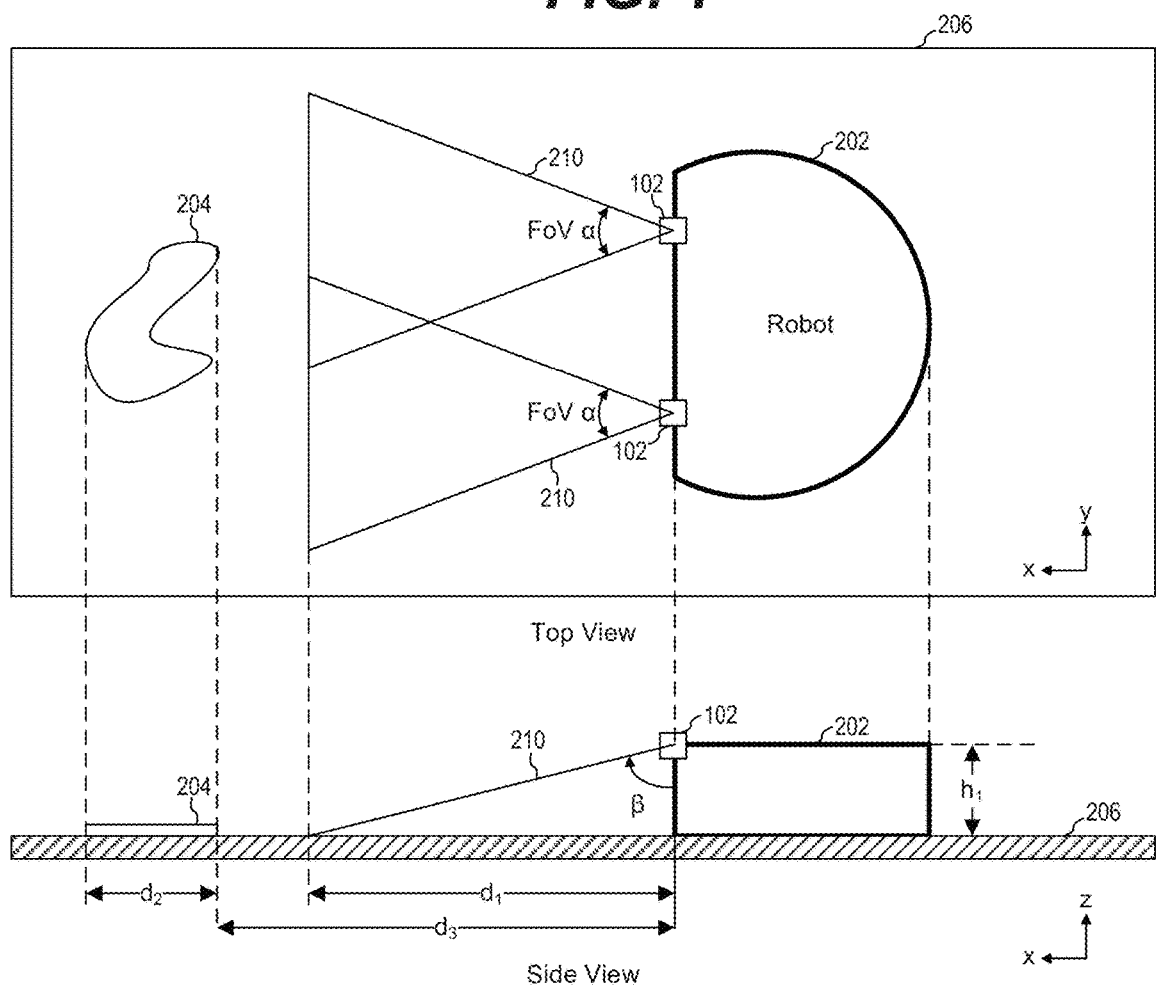
FIG. 2 shows a diagram of a vacuum cleaner robot, according to an embodiment of the present invention.

Identifying liquids without direct physical contact is advantageous in various applications. For example, FIG. 2 shows a diagram of vacuum cleaner robot 202, according to an embodiment of the present invention. Vacuum cleaner robot 202 includes two millimeter-wave radars 102 disposed in the front of vacuum cleaner robot 202. Each millimeter-wave radar 102 has field of view 210 in a direction towards forward movement of vacuum cleaner robot 202.

The top portion of FIG. 2 shows a top view of vacuum cleaner robot 202 moving towards liquid 204 in floor 206. The bottom portion of FIG. 2 shows a side view of vacuum cleaner robot 202 over floor 206. As shown in FIG. 2, each of field of view 210 begins at height $h_1$, has field of view azimuth angle $\alpha$, field of view elevation angle $\beta$ and covers a forward distance $d_1$.

During normal operation, vacuum cleaner robot 202 moves in the x direction with velocity $v_1$. Millimeter-wave radars 102 continuously transmit radiation pulses, receive the echo, process the echo data and determine whether liquid is present in field of view 210. When liquid is detected in field of view 210, vacuum cleaner robot 202 takes a predetermined action. In some embodiments, the predetermined action is taken regardless of the location of the detected liquid in field of view 210. Examples of predetermined actions are: decrease the velocity of movement, stop, move in a different direction (e.g., left, right, or reverse), make a sound, turn on a light, or a combination thereof. Other actions may also be taken.

Field of view 210 covers distance $d_1$ (e.g., 90 cm), has field of view azimuth angle α, which may be, for example 70°, and elevation angle β, which may be, for example, 85°. In some embodiments, field of view azimuth angle α may be 65 to 75 deg. In some embodiments, field of view elevation angle β may be higher than 60°, such as 65° or higher, or may be lower than 60°, such as 55° or lower. In some embodiments, angle β is between 60° and 75°. In some embodiments, distance $d_1$ may be higher than 15 cm, such as 17 cm, 20 cm, or higher, or may be lower than 15 cm, such as 13 cm, 10 cm, or lower.

As shown, vacuum cleaner robot 202 includes two millimeter-wave radars 102 as a specific example. It should be appreciated, however, that embodiments may include a single millimeter-wave radar 102 while other embodiments may include more than two millimeter-wave radars 102. In some embodiments, vacuum cleaner robot 202 includes a plurality of identical millimeter-wave radars. Other embodiments may include different millimeter-wave radars.

Vacuum cleaner robot 202 includes millimeter-wave radars 102 disposed in the front of vacuum cleaner robot 202 at height $h_1$ (e.g., 9 cm) and with a field of view directed to the front of vacuum cleaner robot 202. In some embodiments, at least one of millimeter-wave radars 102 may be disposed in other portions of vacuum cleaner robot 202 and at different heights. For example, in some embodiments, one of millimeter-wave radars 102 may be disposed in the back vacuum cleaner robot 202 and with a field of view towards the back of vacuum cleaner robot 202. Such positioning is advantageous in case vacuum cleaner robot 202 is capable of moving in reverse. Other embodiments may position at least one millimeter-wave radar 102 in a side of vacuum cleaner robot 202 and with a field of view towards the side of vacuum cleaner robot 202. Such positioning is advantageous in case vacuum cleaner robot 202 turns and moves toward the side direction.

In the illustrated example, liquid 204 is static and has a diameter $d_2$, such as 4 cm. It should be understood that liquid 204 may have different dimensions from that which is illustrated. For example, liquid 204 may have a larger diameter, such as 10 cm or higher, or smaller diameter, such as 2 cm or smaller. The shape of liquid 204 may be symmetric, asymmetric, and may have various heights depending on the specific scenario. In some embodiments, liquid 204 may not be static.

Liquid 204 may be, for example, water or a water based liquid, urine, such as cat or dog urine, or other types of liquids. For example, liquid 204 may be a detergent or other chemical.

Vacuum cleaner robot 204 may operate on various types of surface, and travel at various speeds. Although millimeter-wave radars 102 are not moving with respect to vacuum cleaner robot 204, and some of the objects in field of view 210 may be static with respect to floor 206, as vacuum cleaner robot 204 moves, objects may appear as moving objects to millimeter-wave radars 102. Additionally, the vibration of vacuum cleaner robot 202 as vacuum cleaner robot moves across floor 206 may appear as vibrations of objects in the field of view to millimeter-wave radars 102.

In an embodiment of the present invention, a millimeter-wave radar determines whether liquid is present in a field of view of the millimeter-wave radar by generating a 2D image and comparing the 2D image with one or more reference images. The 2D image includes azimuth and depth information of the field of view. A normalization step is performed to compensate for velocity and vibration motions of the vacuum cleaner robot before comparing the 2D image with the one or more references. The one or more reference images are generated using artificial intelligence (AI) algorithms.

Figure 3A:
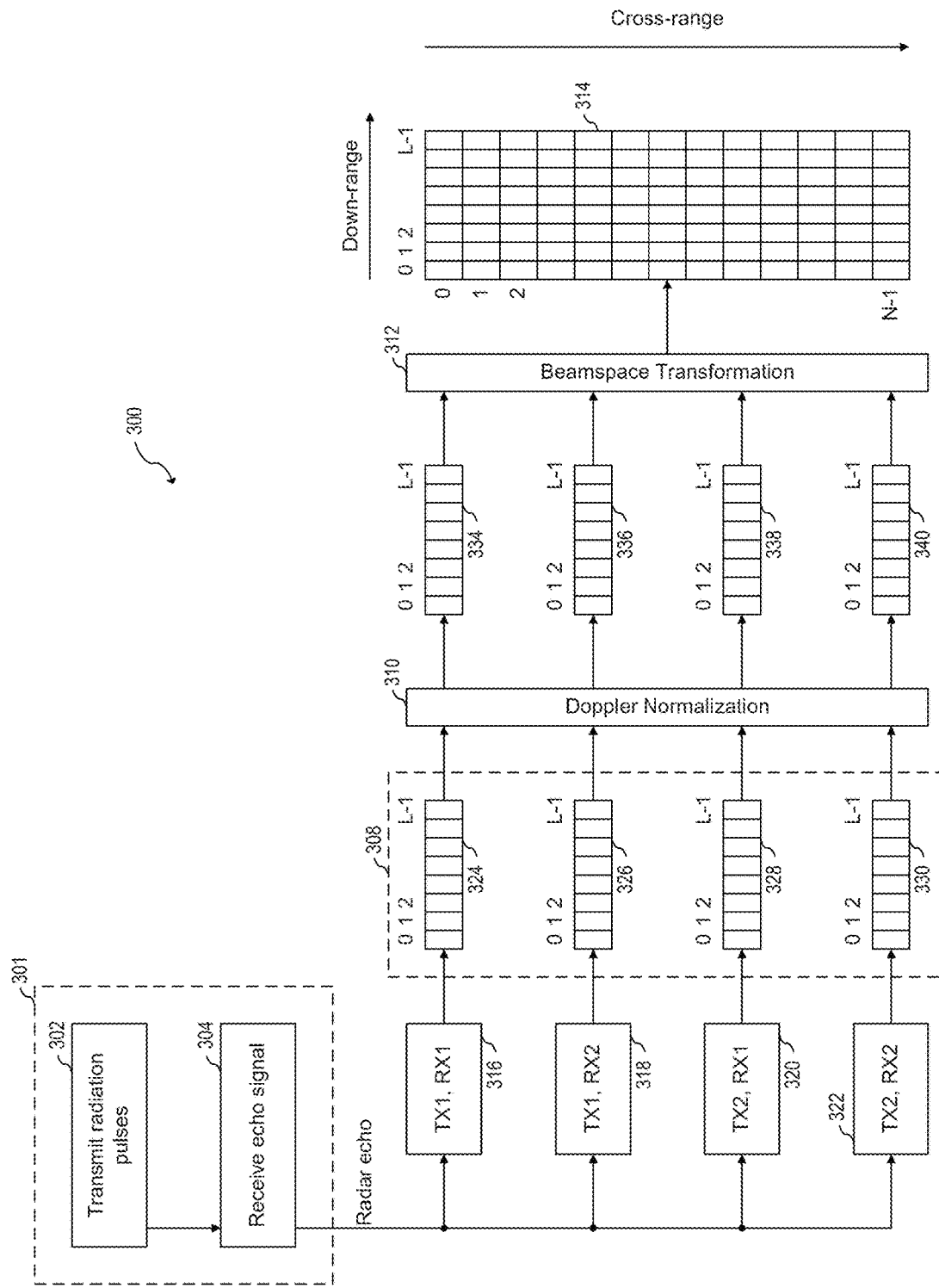
FIG. 3A shows an embodiment method for generating a two-dimensional (2D) image for detecting a liquid with the radar system of FIG. 1 as used in the vacuum cleaner robot of FIG. 2, according to an embodiment of the present invention.

FIG. 3A shows embodiment method 300 for generating 2D image 314 for detecting a liquid with millimeter-wave radar 102 as used in vacuum cleaner robot 202, according to an embodiment of the present invention. Method 300 may be performed, for example, by processor 104.

During step 301, which includes steps 302 and 304, radiation pulses are transmitted by a radar system, reflected by objects within the field of view of the radar system, and received by a radar system, such as millimeter-wave radar 102. During step 302, a series of radiation pulses, such as chirps, are transmitted toward a scene, such as scene 108. Some embodiment radar systems may transmit, for example, 32 chirps during a 500 ms period. Alternatively, a different number of chirps (e.g., 8-256 chirps) over a different period (e.g., 1 s or 250 ms) may be transmitted. In some embodiments, the number of chirps transmitted over a predefined period is a power of 2.

The echo signals are received during step 304 after the radiation pulses are reflected into objects from the scene. The radiation pulses are transmitted from two transmitter elements TX1 and TX2 and are received by two receiver elements RX1 and RX2. For example, at a first time, transmitter element TX1 transmits 32 chirps, which are reflected over objects and received by receiver elements RX1 and RX2, creating virtual channels 316 and 318. At a second time, transmitter element TX2 transmits 32 chirps, which are reflected over objects and received by receiver elements RX1 and RX2, creating virtual channels 320 and 322. Some embodiments may use more than two transmitter elements and/or more than two receiver elements.

Each of the virtual channels 316, 318, 320 and 322, generates respective range vectors 324, 326, 328, and 330 during step 308. Each of range vectors 324, 326, 328 and 330 has L range bins, such as 32. Some embodiments may have less (e.g., 16), or more (e.g., 64, 128, or more) range bins in each range vector.

Since millimeter-wave radar 102 is moving at the same velocity and with the same vibration as vacuum cleaner robot 202, the same velocity and vibration information is present in all virtual channels 316, 318, 320, and 322. During step 310, the velocity and vibration information is extracted from range vector 324 and is used to cancel the velocity and vibration information from virtual channels 316, 318, 320, and 322 to generated normalized range vectors 334, 336, 338, and 340. In some embodiments, a different virtual channel may be used as the reference for performing the normalization step.

In some embodiments, the radial velocity/Doppler component of the target modulates the phase of the received signal at a given range bin (corresponding to its distance) along consecutive pulses at a fixed pulse repetition time. If the $k^{th}$ target scatterer introduces $\omega_k$ Doppler then the vectorized signal along the slow time can be expressed as $$Y(t_s) = \rho_k[\exp(j\omega_k T_{PRT}) \ldots \exp(jN_P\omega_k T_{PRT})]$$

where $\rho_k$ accounts for constants along this dimension, the time index $t_s$ indicates slow time, $T_{PRT}$ represents Pulse Repetition Time and $N_P$ represents the number of pulses in a frame/dwell.

Some embodiments maximize the output signal-to-noise ratio (SNR) in the receiver processing to improve Doppler detection. Maximizing the output SNR may be achieved by matched filtering, which is a time-reversed, conjugate version of the signal. In some embodiments, the matched filter is given by $$h = [\exp(j\omega_k T_{PRT}) \ldots \exp(j\omega_k N_P T_{PRT})]$$

Hence Discrete-Time Fourier Transform (DTFT) is max-SNR detector for estimating target's radial velocity/Doppler/vibration and thus coherent processing technique involves deploying FFT along the slow time.

During step 312, a beamspace transformation is performed, in which each of the range bins of normalized range vectors 334, 336, 338, and 340 is expanded to have N bins, where N may be, for example, 121. In some embodiments, N may be 81, 61, 41, or another number.

A 2D image 314 is generated with L range bins and N azimuth bins from normalized range vectors 334, 336, 338 and 340. Since 2D image 314 is generated from normalized range vectors, 2D image 314 is independent, or loosely dependent from the vibration and velocity of vacuum cleaner robot 202. The normalization step, therefore, advantageously facilitates the comparison step with one or more reference 2D images to determine the presence of liquids in the field of view of the millimeter-wave radar. The normalization step allows for detection of liquids when vacuum cleaner robot 202 is moving as well as when vacuum cleaner robot 202 is not moving, or moving slowly.

Figure 3B:
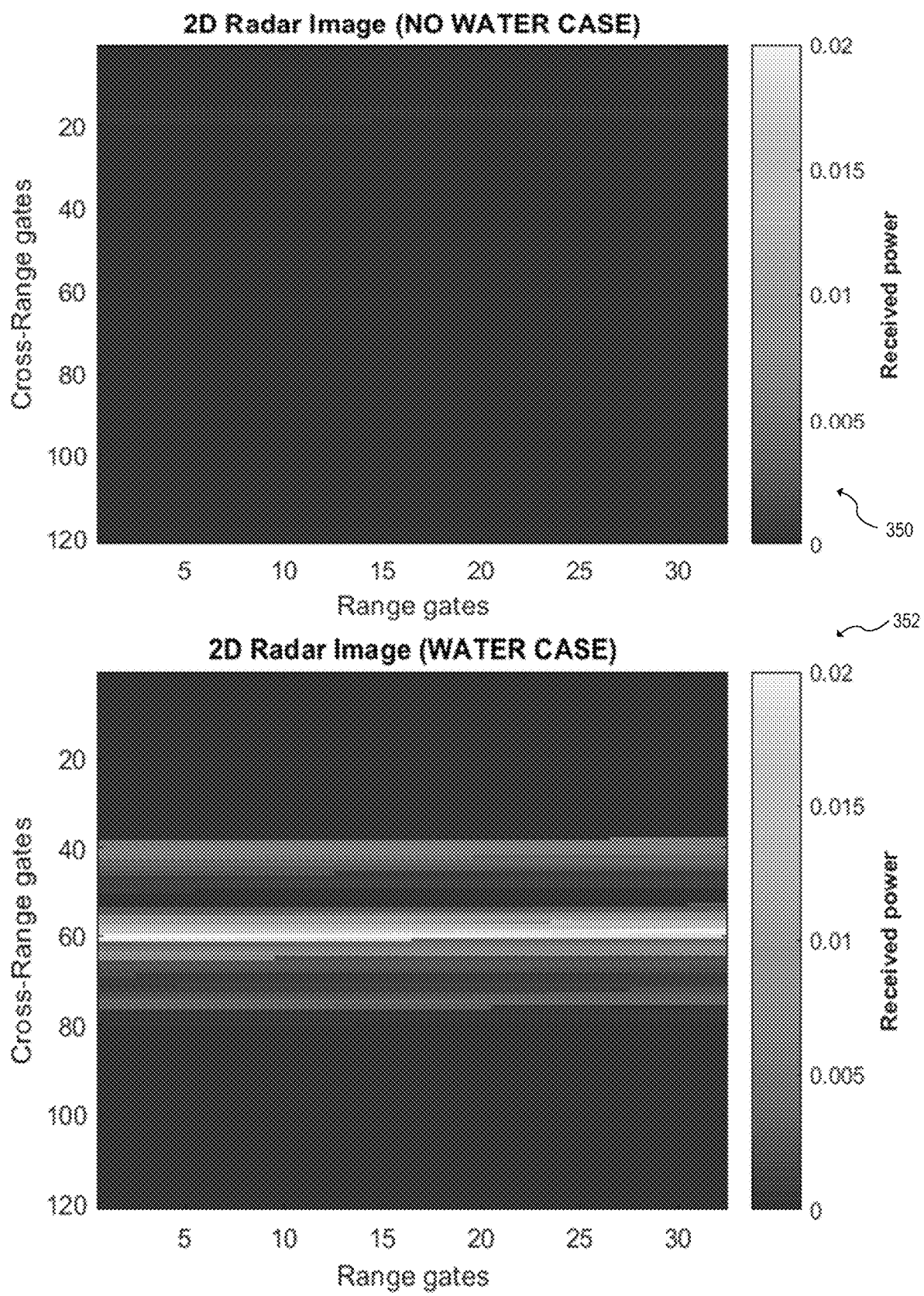
FIG. 3B shows example of 2D images, according to an embodiment of the present invention.

FIG. 3B shows example 2D images, according to an embodiment of the present invention. The top portion of FIG. 3B shows 2D image 350 illustrating that no liquid is present in the field of view of the millimeter-radar. The bottom portion of FIG. 3B shows 2D image 352 illustrating that liquid is present from nearest detectable distance (range bin 0) up to distance $d_1$ (range bin 31) at the center of the azimuth range (bin 60 of 121).

In some embodiments, the beamspace transformation is performed in all range bins to generate 2D image 314. In other embodiments, only the range bins with identified objects are beamspace transformed. The range bins without identified objects are populated with, e.g., zeros, in 2D image 314. By performing the beamspace transformation on only the range bins with identified objects, the computation power is reduced, and the speed of generation of 2D image 314 is increased. Increasing the speed of generation of 2D image 314 is advantageous to allow enough time for vacuum cleaner robot 202 to react to the presence of liquid in the field of view of millimeter-wave radar 102.

Figure 4A:
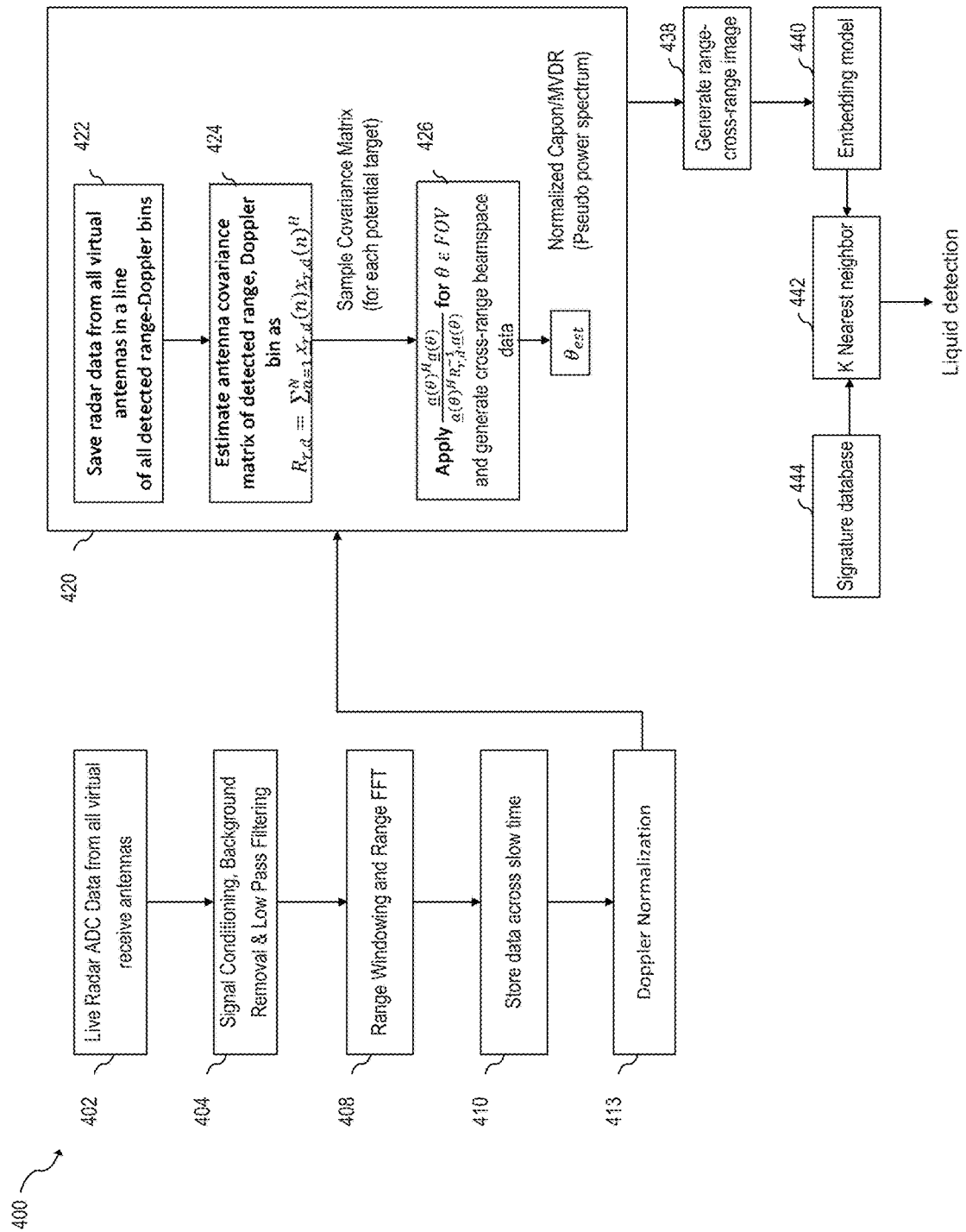
FIG. 4A illustrates a block diagram of an embodiment method of performing a millimeter-wave sensor based liquid detection using a millimeter-wave radar sensor.

FIG. 4A illustrates a block diagram of embodiment method 400 of performing a millimeter-wave sensor based liquid detection. Method 400 may be implemented by, e.g., vacuum cleaner robot 202. Radar processing occurs as follows. In steps 402, 404, 408, 410, and 413, radar data is collected from the millimeter-wave radar sensor and objects are detected in the field of view of the millimeter-wave radar sensor. In step 420, and 438, a range-cross-range 2D image having azimuth and depth information is generated, in part, using a Capon/MVDR analysis. During steps 440, 442 and 444, the 2D image is transformed according to a predictive model and is compared with 2D reference images of a signature database to determine whether liquid is present in the field of view.

In step 402, live radar data is collected from the millimeter wave radar sensor. In some embodiments, this radar data is collected form digitized baseband radar data and may include separate baseband radar data from multiple antennas. In some embodiments, these antennas may be "virtual antennas" as explained above.

In step 404, signal conditioning, low pass filtering and background removal is performed. During step 404, radar data received during step 402 is filtered, DC components are removed, and IF data is filtered to, e.g., remove the Tx-Rx self-interference and optionally pre-filtering the interference colored noise. In some embodiments, filtering includes removing data outliers that have significantly different values from other neighboring range-gate measurements. Thus, this filtering also serves to remove background noise from the radar data. In a specific example, a Hampel filter is applied with a sliding window at each range-gate to remove such outliers. Alternatively, other filtering for range preprocessing known in the art may be used.

In step 408, a series of FFTs are performed on conditioned radar data produced by step 404. In some embodiments, a windowed FFT having a length of the chirp (e.g., 256 samples) is calculated along each waveform for each of a predetermined number of chirps in a frame of data. Alternatively, other frame lengths may be used. The FFTs of each waveform or chirp may be referred to as a "range FFT." In alternative embodiments, other transform types could be used besides an FFT, such as a Discrete Fourier Transform (DFT) or a z-transform. In step 410, the results of each range FFT are stored in slow time.

In step 413, a Doppler FFT is derived based on a series of range FFTs collected in slow time. In some embodiments, calculating the Doppler FFT entails calculating a windowed two-dimensional FFT of the range FFT over slow-time to determine the velocity and vibration of detected objects. Since such velocity and vibration relates to the velocity and vibration of the vacuum cleaner robot, the velocity and vibration information can be used to remove the velocity and vibration components from the range FFT data, as explained with respect to FIG. 3B.

In various embodiments, a beam is formed at the transmitter by post processing a plurality of baseband signals based on a plurality of signals received by different receivers or a combination thereof. Implementing beamforming by post processing received baseband signals may allow for the implementation of a low complexity transmitter.

In one example, a millimeter-wave sensor system is used with $N_t=2$ transmit (TX) elements and $N_r=2$ receive (RX) elements arranged in a linear array. Accordingly, there are $N_t \times N_r=4$ distinct propagation channels from the TX array to the RX array in a linear array configuration for azimuth angle profiling. If the transmitting source (TX channel) of the received signals can be identified at the RX array, a virtual phased array of $N_t \times N_r$ elements can be synthesized with $N_t+N_r$ antenna elements. In various embodiments, a time division multiplexed MIMO array provides a low cost solution to a fully populated antenna aperture capable of near field imaging.

Figure 4B:
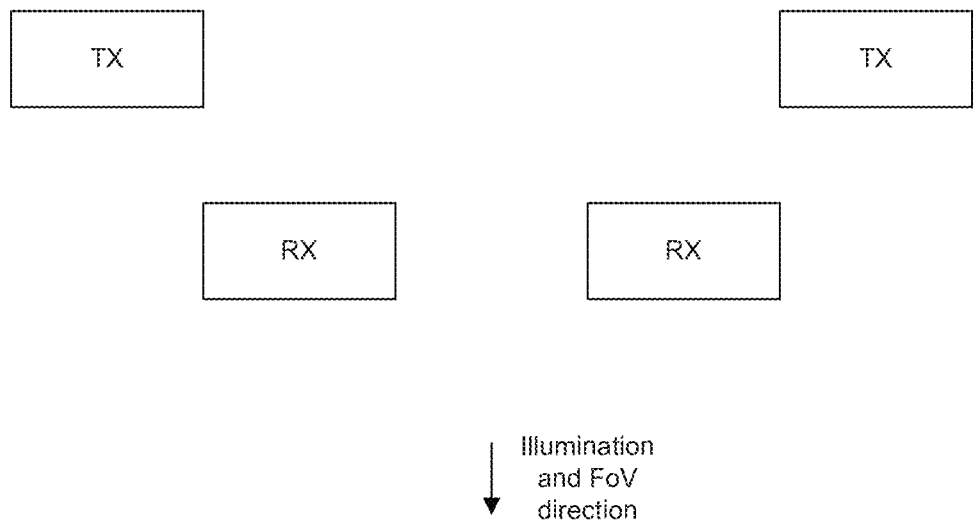
FIG. 4B shows a possible arrangement of TX and RX elements of a millimeter-wave radar sensor circuit.

In some embodiments, a symmetrical linear arrangement of the TX and the RX elements with some vertical offset between the TX array and the RX array for reduced coupling may be used. For example, with respect to FIG. 2, the TX and RX elements of millimeter-wave radar 102 may be disposed with the arrangement shown in FIG. 4B, where the TX elements illumination and field of view direction is directed towards the front of vacuum cleaner robot 202.

Figure 4C:
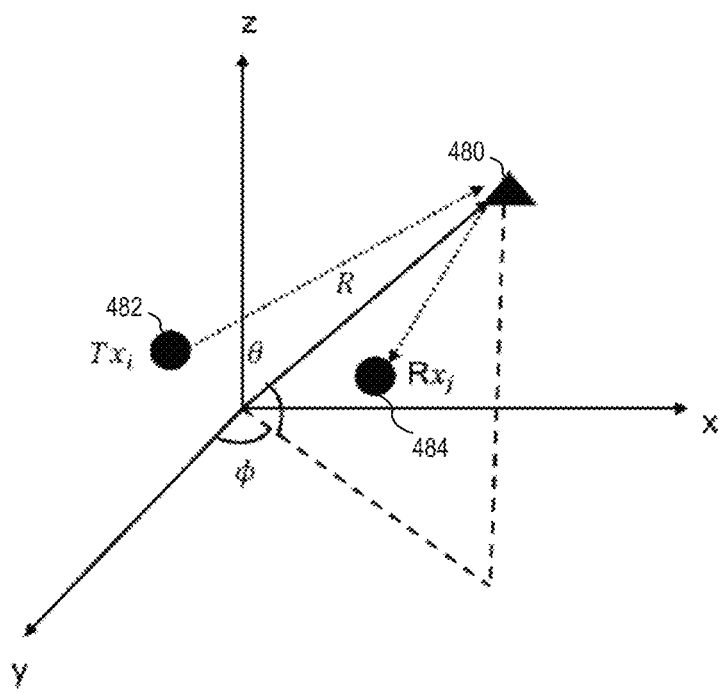
FIG. 4C shows a graphical representation of beamforming, according to an embodiment of the present invention.

FIG. 4C shows a coordinate axes used to illustrate an embodiment algorithm. As shown, FIG. 4C illustrates the position of target 480, transmit (TX) antenna element 482 and receive (RX) antenna element 484. The position r of target 480 can be represented as $r=[R\cos(\theta)\sin(\phi); R\cos(\theta)\cos(\phi); R\sin(\theta)]$ where R is the distance from the origin to target 480. The directional vector u of target 480 can be expressed as $u=[\cos(\theta)\sin(\phi);\cos(\theta)\cos(\phi);\sin(\theta)]$ Denoting the 3D positional coordinates of the TX antenna element as $d_i^{Tx}$, i=1, 2 and the RX antenna element as $d_j^{Rx}$, j=1, 2 in space, then on assuming far field conditions, the signal propagation from a TX element $d_i^{Tx}$ to target 580 (assumed to be a point scatterer) and subsequently the reflection from target 480 to Rx antenna element $d_j^{Rx}$ can be approximated as $2*x+d_{ij}$, where x is the based distance of target 480 to the center of the virtual linear array, and $d_{ij}$ refers to the position of the virtual element to the center of the array.

The transmit steering vector may be written as:

$$a_i^{Tx}(\theta, \phi) = \exp\left(-j2\pi \frac{d_i^{Tx} u(\theta, \phi)}{\lambda}\right); i = 1, 2$$

and the receiving steering vector may be expressed as:

$$a_j^{Rx}(\theta, \phi) = \exp\left(-j2\pi \frac{d_j^{Rx} i(\theta, \phi)}{\lambda}\right); j = 1, 2$$

where λ is the wavelength of the transmit signal. A joint TX and RX steering vector $\alpha(\theta, \phi)$ can be derived as the Kronecker of the transmit and receive steering vectors (assuming i=j=1):

$\alpha(\theta,\phi)=\alpha_i^{Tx}(\theta,\phi)\otimes\alpha_j^{Rx}(\theta,\phi); i=j=1$ From the joint steering vector, the following beamspace spectrum may be computed from which angles θ and φ may be estimated according to a minimum variance distortionless response (MVDR) algorithm:

$$P(\theta, \phi) = \frac{a(\theta, \phi)^H a(\theta, \phi)}{a(\theta, \phi)^H C\, a(\theta, \phi)}$$

In the above expression, $C=E\{x(r,d)x(r,d)^H\}$ is calculated as a covariance matrix, where $E\{.\}$ is the expectation operator. The above covariance matrix may be estimated as sample matrix indicator as $$C = \frac{1}{N}\sum_{n=1}^{N} x_i(r, d) x_i(r, d)^H$$

where $x_i(r,d)$ represents measured range, Doppler data (r, d).

For the generation of 2D images in which azimuth and range are considered, the value of angle φ may be known or assumed and the determination of angle φ may be omitted. For example, in some embodiments, φ is equal to zero. In various embodiments, a MVDR algorithm is applied as follows.

In step 422 data is saved from all virtual antennas in a line of detected range-Doppler bins. In step 424, the antenna covariance matrix of the detected range-Doppler bins is estimated as follows:

$R_{r,d}=\Sigma_{n=1}^{N} \underline{x}_{r,d}(n)\underline{x}_{r,d}(n)^H$, where $R_{r,d}$ is antenna covariance matrix, $\underline{x}_{r,d}(n)$ represents the data over a particular (range, Doppler)=(r,d) and n represents the specific (r,d) data across multiple frames (n being the indices, and N is the number of frames considered). In step 426, a MVDR algorithm is applied to the range and Doppler data as follows using the above derived covariance matrix:

$$P(\theta) = \frac{\underline{a}(\theta)^H \underline{a}(\theta)}{\underline{a}(\theta)^H R_{r,d}^{-1} \underline{a}(\theta)},$$

where P(θ) represents azimuth spatial spectrum, and $\underline{a}(\theta)$ is the virtual antenna steering vector along the azimuth angle for test angle θ within the field of view. In an embodiment, the value θ is found that provides a peak value for P(θ). This determined value for θ is the estimated azimuth angle $\theta_{est}$ of the detected foreign object.

In step 438, a range-cross-range 2D image having azimuth and range information is generated. In some embodiments, the 2D image includes information for all range bins. In other embodiments, the 2D image only includes information in the range bins in which objects have been identified. Range bins without an identified object are populated with, e.g., zeros.

In step 440, also referred to as transformation step or embedding step, the 2D image is transformed using a prediction model generated by an embedding process. During the transformation step, the 2D image is mapped into a transformed 2D image or vector that allows for easy liquid identification. For example, although a liquid object and a non-liquid object may be close to each other in the 2D image, the liquid object and the non-liquid object are far from each other (in Euclidean terms) in the transformed 2D image or vector. The transformed 2D image is compared with one or more reference signatures of a signature database using a nearest neighbor algorithm to determine whether a liquid is present in the field of view.

The application implementing method 400, such as a vacuum cleaner robot, may take an action based on whether liquid is detected. For example, when liquid is detected. The vacuum cleaner robot may decrease the velocity of movement, stop, move in a different direction (e.g., left, right, or reverse), make a sound, turn on a light, or a combination thereof. Other actions may also be taken.

Figure 5:
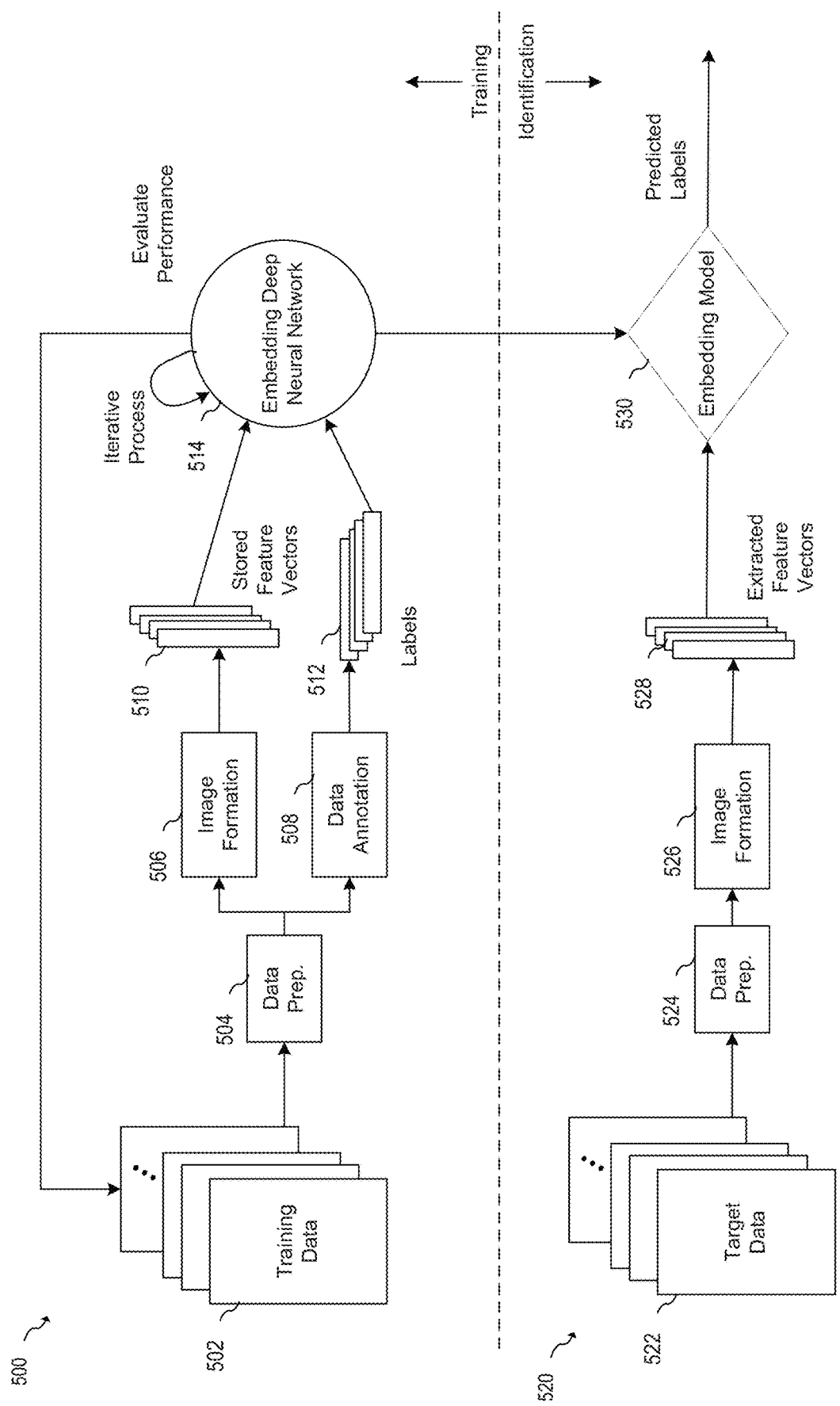
FIG. 5 illustrates a block diagram showing a machine learning pipeline for feature extraction and identification.

Vacuum cleaner robot detects liquids of various diameters in various types of floors and while moving at various speeds or when not moving. FIG. 5 illustrates a block diagram showing a machine learning pipeline for machine language based feature extraction and identification that can be used to generate reference signatures (step 444) to classify an object as liquid (step 442). The top portion 500 of FIG. 5 is devoted to the processing storage of features for comparison to later measurements. The data and steps shown in this portion represent the actions performed when radar measurements are performed and processed for a classification category. The bottom portion 520 is devoted to the processing and comparison of new measurements for comparison to stored data. These data and steps represent the actions performed when the system is identifying and detecting liquids.

As shown in the top portion 500 of FIG. 5, training data 502 is transformed into stored feature vectors 510 and corresponding labels 512. Training data 502 represents the raw data (e.g., echo). Feature vectors 510 represent sets of generated vectors that are representative of the training data

502. Labels 512 represent user metadata associated with the corresponding training data 502 and feature vectors 510.

As shown, training data 502 is transformed into feature vectors 510 using embodiment image formation algorithms. Data preparation block 504 represents the initial formatting of raw sensor data, and data annotation block 508 represents the status identification from training data 502.

During operation, one or more radar images are taken of a controlled environment that includes one or more liquid and/or non-liquid objects using millimeter-wave sensors described above. In some cases, multiple radar images are recorded to increase the accuracy of identification. Embedding deep neural network 514 evaluates the ability of an embedding model 530 to identify feature vectors and iteratively updates training data 502 to increase the classification accuracy of the algorithm. The training performance of the machine learning algorithm may be determined by calculating the cross-entropy performance. In some embodiments, the embedding deep neural network 514 iteratively adjusts image formation parameters for a classification accuracy of at least 90%. Alternatively, other classification accuracies could be used.

Embedding deep neural network 514 may be implemented using a variety of machine learning algorithms known in the art. For example, a neural network algorithms, such as comma.ai, Nvidia SDC CNN, LeCunn Net, or other neural network algorithms known in the art, may be used for classification and analysis of stored feature vectors 510. During the iterative optimization of stored feature vectors 510, a number of parameters of image formation 506 may be updated.

Once the system has been trained using reference training data 502, the reference signatures may be used for classification during normal operation. During normal operation, new target data 522 is received. Data preparation block 524 prepares the new target data 522 for image formation, and image formation block 526 forms new extracted feature vectors 528. Embedding model 530 utilizes embedding deep neural network 514 to match new extracted feature vectors 528 to a stored feature vector 510. When a match is identified, a predicted label is provided that identifies the new feature vector. In some embodiments, data from the stored labels 512 is provided as a predicted label. Embedding model 530 may be a machine learning model with optimal parameters computed/evaluated through a machine learning algorithm.

The normalization step simplifies the reference signature generation during the training phase by removing speed of movement and associated vibration as a variable. In other words, the training phase, as described with respect to FIG. 5, may be performed with static images rather than generating images with vacuum cleaner robot moving at different speeds. During the identification phase, the same normalization step is applied to the 2D image before it is compared with the reference signatures to identify liquids in the field of view.

Figure 6:
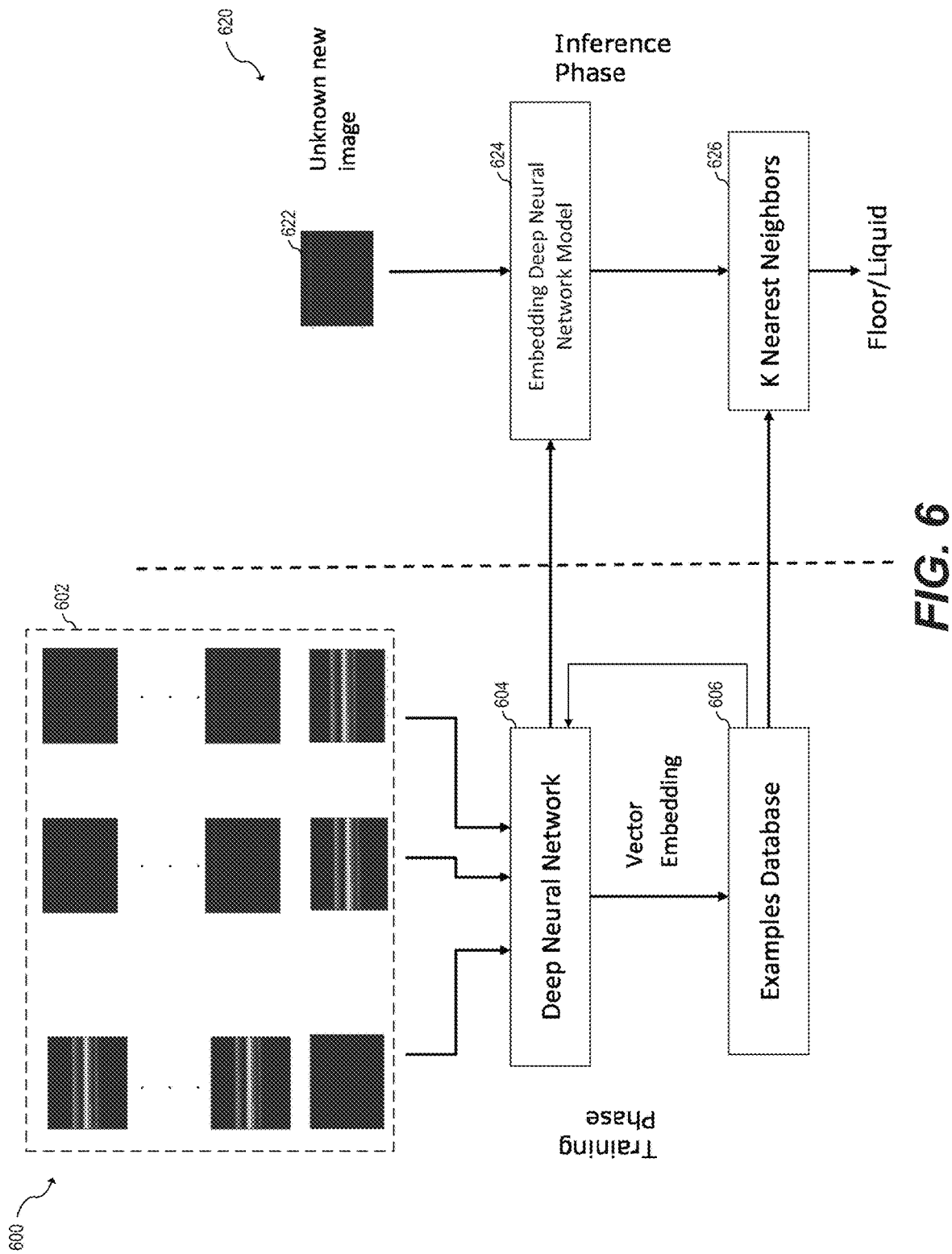
FIG. 6 illustrates a block diagram showing an embedding process flow, according to an embodiment of the present invention.

To facilitate identification of liquids over various types of floors having different surfaces and materials, an embedding process is used to generate embedding vector in higher dimensional transformed space (steps 440, 530). FIG. 6 illustrates a block diagram showing an embedding process flow, according to an embodiment of the present invention. The left portion 600 of FIG. 6 is devoted to the embedding process during the training phase. The right portion 620 is devoted to an inference phase, in which processing and comparison of new images using the embedded prediction model with reference images takes place.

During the training phase, images from set of images 602 are analyzed three at a time. For example, during step 604, a deep neural network module receives a first 2D image of a first floor with a liquid, a second 2D image of a second floor with a liquid, and a third 2D image of a floor without a liquid. The deep neural network module generates respective vectors for the first, second and third 2D images, which are stored in an example database during step 606. The deep neural network module then modifies the measurement/transform function so that the generated vectors associated with having liquids (e.g., first and second 2D images in this example) are close to each other (in Euclidean terms) and are far from the vectors associated with not having liquids (e.g., third 2D image in this example) in Euclidean terms. In this example, the embedding process modifies the measurement/transform function such that the first and second vectors are closer to each other than the second and third vectors.

Steps 604 and 606 are repeated for all 2D images of set 602. In some embodiments, different permutations of 2D images from set 602 are analyzed during steps 604 and 606. Set 602 may have thousands or tens of thousands of 2D images.

After iterating through steps 604 and 606, the resulting deep neural network module measurement/transform function is tuned to determine whether liquid is present in various types of floors. The resulting deep neural network module is also referred to as the prediction deep neural network model, which is used during the inference phase. Since the measurement/transform function has been tuned to distinguish floors with liquids from floors without liquids, accurate detection of liquids in floors that were not used during the training phase is possible.

In some embodiments, the vectors generated by the deep neural network module are vectors in a, e.g., 32 or 16 dimensional space. Some embodiments may use a different number of dimensions. In some embodiments, the deep neural network module may generate other multi-dimensional data structures instead of vectors, such as, matrices. In other embodiments, deep neural network module may generate vectors in other dimensional spaces.

During the inference phase (e.g., during normal operation), new 2D image 622 is received. New 2D image 622 may be generated as described with respect to methods 300 and 400. The embedding deep neural network model 624 generates a new vector using the measurement/transform function generated during the training phase. During step 626, the new vector is compared with the database of reference vectors generated during step 606 to determine whether liquid is detected in new 2D image 622. The k nearest neighbor algorithm may be used to compare the new vector with the reference vectors during step 626.

In some embodiments, millimeter-wave radar 102 includes a transparent enclosure (i.e., transparent to the transmitted and received frequencies used by millimeter-wave radar 102) that at least partially encloses the TX and RX elements of millimeter-wave radar 102. Due to the material and geometric properties of the transparent enclosure, some of the pulses transmitted by the TX elements may be reflected by the transparent enclosure instead of by objects in the field of 210. Reflections from the transparent enclosure may create backscatter that appears as noise in the echo data and 2D images analyzed in methods 300 and 400. High amounts of backscatter may result in improperly determining whether liquid is present in the floor.

Figure 7A:
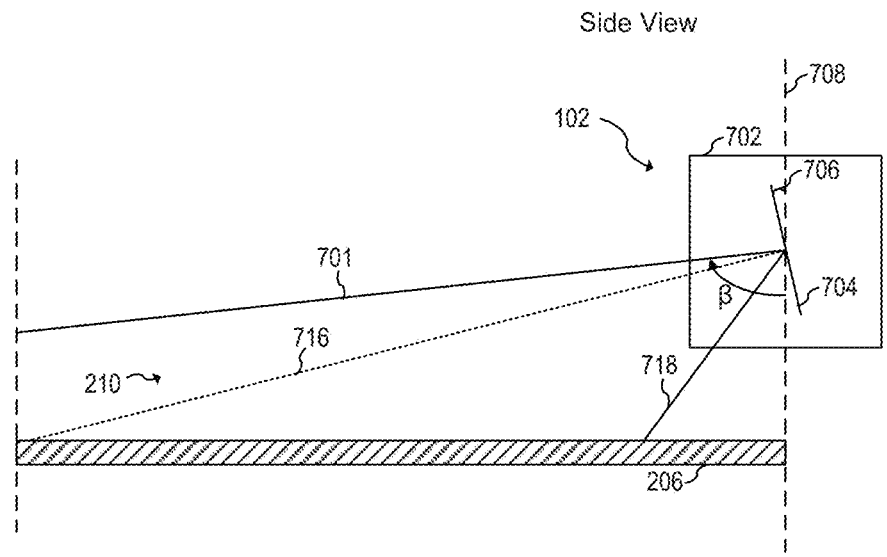
FIGS. 7A-7C show the millimeter-wave radar of FIG. 2 having a transparent enclosure, according to an embodiment of the present invention.

FIG. 7A shows millimeter-wave radar 102 having transparent enclosure 702, according to an embodiment of the present invention. As shown in FIG. 7A (not to scale), millimeter-wave radar 102 includes transparent enclosure 702. Field of view 210 covers the area between field of view lines 701 and 718, and has centerline 716 that is orthogonal to surface axis 704, and axis 708 is parallel to a vertical side wall of transparent enclosure 702.

Backscatter is minimized when angle 706 between axis 704 and axis 708 is between 25° and 40°. For example, in some embodiments, angle 706 is 30°. A different angle β may be achieved while minimizing backscatter by rotating transparent enclosure 702 while keeping angle 706 fixed.

Transparent enclosure 702 may be implemented with plastic, glass, or other types of materials. For example, some embodiments may implemented transparent enclosure 702 with Polycarbonate, Polyamide or ABS.

In an embodiment, height $h_2$ and distance $d_4$ are 8 mm and 8 mm, respectively. Other embodiments may use different dimensions. For example, some embodiments have height $h_2$ and distance $d_4$ between 7-10 mm. In some embodiments, angle β is selected to minimize the blind spot immediate to the radar platform while maximizing the range of the field of view and minimizing backscatter.

Figure 7B:
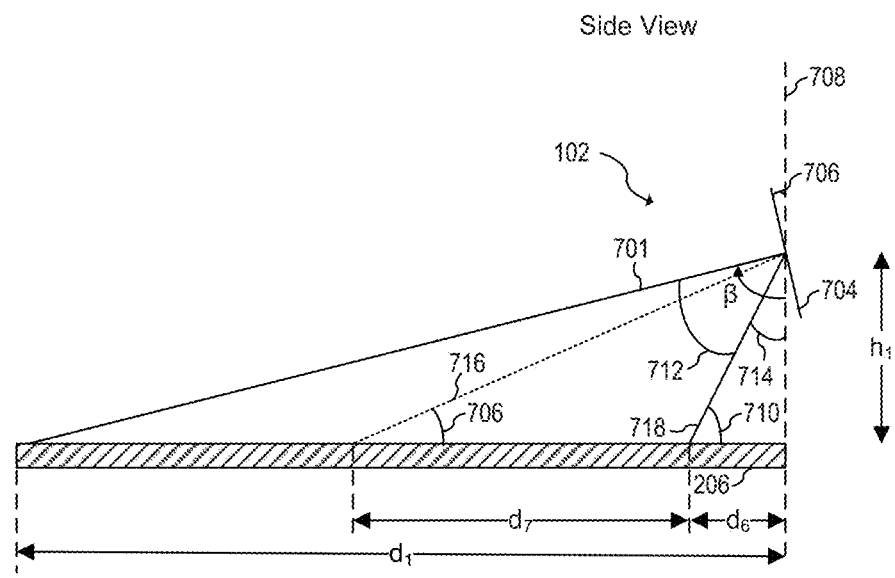

FIG. 7B shows additional field of view details of millimeter-wave radar 102 as shown in FIG. 7A, according to an embodiment of the present invention. Transparent enclosure 702 has been omitted in FIG. 7B for clarity purposes. In an embodiment, angle 714 is 25°, angle 710 is 65°, angle 706 is 30°, angle 712 is 700, height $h_1$ is 8 cm, blind distance $d_6$ is 3.7 cm, and distance $d_7$ is 13.85 cm. In other embodiments, angle 714 is 15°, angle 710 is 75°, angle 706 is 40°, angle 712 is 70°, height $h_1$ is 8 cm, blind distance $d_6$ is 2.14 cm, and distance $d_7$ is 9.53 cm and distance $d_1$ is 91.44 cm. Other values for angles 706, 710, 712, 714, distances $d_1$, $d_6$, and $d_7$, and height $h_1$ are possible.

Figure 7C:
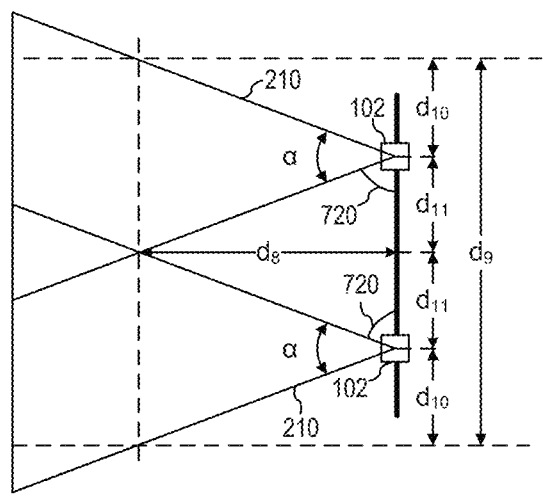

FIG. 7C shows a top view of millimeter-wave radar 102, as shown in FIGS. 7A and 7B, according to an embodiment of the present invention. Transparent enclosure 702 has been omitted in FIG. 7C for clarity purposes. In an embodiment, angle α is 70°, angle 720 is 55°, distance $d_8$ is 119.25 mm, distance $d_9$ is 340 mm, distance $d_{10}$ is 81.5 mm, distance $d_{11}$ is 88.5 mm, where distance $d_9$ is the distance between edges of vacuum cleaner robot 202. Other values for angles α and 720, and distances $d_8$, $d_9$, $d_{10}$, and $d_{11}$ are possible.

Various applications, other than vacuum cleaner robot 202, may implement the embodiments disclosed. For example, other mobile applications, such as other mobile robots or vehicles having a millimeter-wave radar attached may implement the embodiments disclosed.

Figure 8:
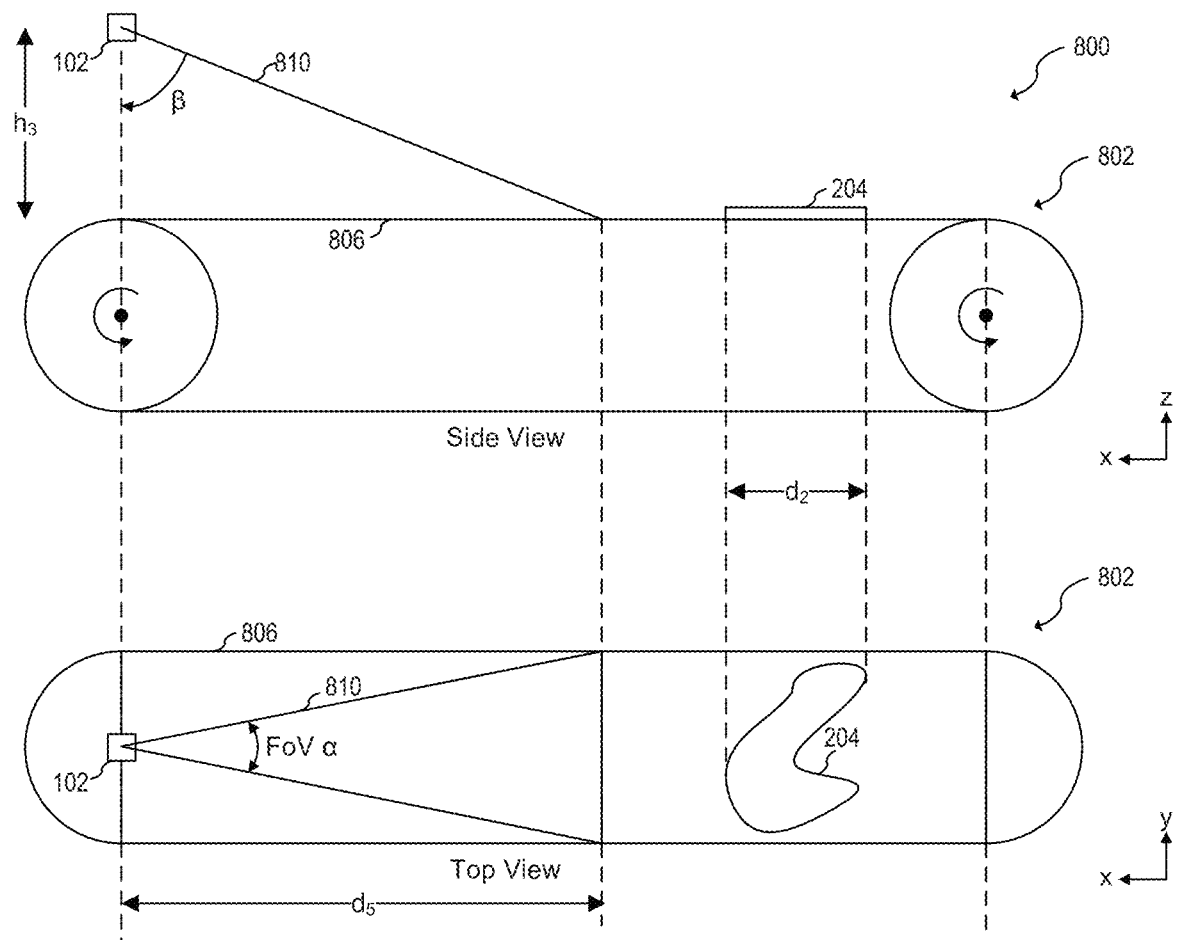
FIG. 8 shows a diagram of a conveyor belt, according to an embodiment of the present invention.

Liquid detection may also be implemented in applications in which the millimeter-wave radar is static and the surface containing the liquid is moving. For example, FIG. 8 shows a diagram of conveyor belt system 800, according to an embodiment of the present invention. Conveyor belt system 800 may be, for example, a conveyor belt system in a warehouse, factory, airport security, or supermarket. Conveyor belt system 800 includes conveyor belt 802 and millimeter-wave radar 102 that has field of view 810 in a direction towards belt surface 806. Millimeter-wave radar 102 operates in a similar manner in conveyor belt system 800 than in vacuum cleaner robot 202. In conveyor belt system 800, however, instead of millimeter-wave radar 102 moving with respect to surface 206, belt surface 806 moves with respect to millimeter-wave radar 102. Conveyor belt system may implement methods 300, 400, 500, and 600, for detecting a liquid in a surface.

The top portion of FIG. 8 shows a side view of conveyor belt system 800 where belt surface moves objects towards the left of FIG. 8 (e.g., moving liquid 204 towards field of view 810). The bottom portion of FIG. 8 shows a top view of conveyor belt system 800. As shown in FIG. 8, field of view 810 begins at height $h_3$ with respect to belt surface 806, has field of view azimuth angle α, field of view elevation angle β and covers a forward distance $d_5$.

During normal operation, conveyer belt surface 806 moves in the x direction with velocity $v_2$. Millimeter-wave radars 102 operates in a similar manner as described with respect to FIGS. 1-7. When liquid is detected in field of view 810, conveyor belt system 800 takes a predetermined action. Examples of predetermined actions are: decrease the velocity of movement of belt surface 806, stop movement of belt surface 806, move belt surface 806 in the reverse direction, make a sound, turn on a light, or a combination thereof. Other actions may also be taken.

Field of view 810 covers distance $d_5$ (e.g., 15 cm), has field of view azimuth angle α, which may be, for example 70°, and elevation angle β, which may be, for example, 60°. In some embodiments, field of view azimuth angle α may be higher than 70°, such as 75° or higher, or may be lower than 70°, such as 65° or lower. In some embodiments, field of view azimuth angle α may be between 65° and 70°. In some embodiments, field of view elevation angle β may be higher than 60°, such as 65° or higher, or may be lower than 60°, such as 55° or lower. In some embodiments, angle β is between 65° and 85°. In some embodiments, distance $d_5$ may be higher than 15 cm, such as 17 cm, 20 cm, or higher, or may be lower than 15 cm, such as 13 cm, 10 cm, or lower. In some embodiments, angle β is selected based on height $h_3$ to optimize field of view 810, as described, for example, with respect to FIGS. 7A and 7B.

Conveyor belt system 800 includes a single millimeter-wave radar 102. Some embodiments may include more than one millimeter-wave radar 102, which may or may not be identical to each other.

Belt surface 806 may operate in various speeds and may carry different types and sizes of objects. Field of view 810 may cover the biggest objects that are configured to be carried by belt surface 806. Height $h_3$ may be adjusted to allow for field of view 810 to cover bigger objects.

Example embodiments of the present invention are summarized here. Other embodiments can also be understood from the entirety of the specification and the claims filed herein.

Example 1

A device including: a millimeter-wave radar sensor circuit configured to generate N virtual channels of sensed data, where N is an integer number greater than one; and a processor configured to: generate a 2D radar image of a surface in a field of view of the millimeter-wave radar sensor circuit based on sensed data from the N virtual channels of sensed data, where the 2D radar image includes azimuth and range information, generate a multi-dimensional data structure based on the 2D radar image using a transform function, compare the multi-dimensional data structure with a reference multi-dimensional data structure, and determine whether liquid is present in the field of view of the millimeter-wave radar sensor circuit based on comparing the multi-dimensional data structure with the reference multi-dimensional data structure.

Example 2

The device of example 1, where multi-dimensional data structures generated by the processor and corresponding to surfaces having a liquid are close to each other in Euclidean terms and far, in Euclidean terms, from multi-dimensional data structures generated by the processor and corresponding to surfaces without a liquid.

Example 3

The device of one of examples 1 or 2, where the device is mounted on a moving vehicle.

Example 4

The device of one of examples 1 to 3, where the moving vehicle is a vacuum cleaner robot.

Example 5

The device of one of examples 1 to 4, where the surface is a surface of a conveyor belt.

Example 6

The device of one of examples 1 to 5, where the millimeter-wave radar sensor circuit includes two transmitters and two receivers.

Example 7

The device of one of examples 1 to 6, where the two transmitters and two receives have a symmetrical linear arrangement with a vertical offset between the two transmitters and the two receivers.

Example 8

The device of one of examples 1 to 7, where the two transmitters and two receivers generate four virtual channels of sensed data.

Example 9

The device of one of examples 1 to 8, where the processor is further configured to: determine velocity and vibration of the surface with respect to the field of view of the millimeter-wave radar sensor circuit using sensed data of a first virtual channel of the N virtual channels; normalize sense data of the N virtual channels based on the determined velocity and vibration; and generate the 2D radar image based on the normalized sense data.

Example 10

The device of one of examples 1 to 9, where the processor is further configured to generate the 2D radar image by: performing a range transform on each of the N virtual channels of sensed data to generate N corresponding range vectors, where each of the N range vectors includes M range bins, where M is an integer number greater than one; and generating a set of beamspace vectors, where each vector of the set of beamspace vectors corresponds to a respective range bin of the N corresponding range vectors in azimuth, and where each vector of the set of beamspace vectors includes L cells, where L is larger than N.

Example 11

The device of one of examples 1 to 10, where performing the range transform includes performing a range Fast Fourier Transform (FFT).

Example 12

The device of one of examples 1 to 11, where N is 5, M is 32, and L is 121.

Example 13

The device of one of examples 1 to 12, where the millimeter-wave radar sensor circuit includes a transparent enclosure having transmitter and receiver elements, where the field of view is orthogonal to a first axis, and where the first axis and an axis parallel to a surface of the transparent enclosure has a first angle between 25° and 40°.

Example 14

The device of one of examples 1 to 13, where the transform function is generated using embedding.

Example 15

The device of one of examples 1 to 14, where the reference multi-dimensional data structure is generated using an embedding deep neural network.

Example 16

The device of one of examples 1 to 15, where the liquid includes water.

Example 17

A method for detecting a liquid from a moving vehicle, the method including: generating a 2D radar image of a surface in a field of view of a millimeter-wave radar sensor circuit based on sensed data from N virtual channels generated by the millimeter-wave radar sensor circuit; generating a multi-dimensional data structure based on the 2D radar image using a transform function; comparing the multi-dimensional data structure with a reference multi-dimensional data structure; and determining whether liquid is present in the field of view of the millimeter-wave radar sensor circuit based on comparing the multi-dimensional data structure with the reference multi-dimensional data structure.

Example 18

The method of example 17, where multi-dimensional data structures corresponding to surfaces having a liquid are close to each other in Euclidean terms and far, in Euclidean terms, from multi-dimensional data structures corresponding to surfaces without a liquid.

Example 19

The method of one of examples 17 or 18, where the multi-dimensional data structure includes a vector and the reference multi-dimensional data structure includes a reference vector, the method further including generating the transform function by: analyzing a set of 2D training images, where a first subset of 2D training images of the set of 2D training images correspond to images of surfaces including liquids and a second subset of 2D training images of the set of 2D training images correspond to images of surfaces without liquids; and generating sets of training vectors that correspond to respective 2D training images based on analyzing the set of 2D training images by using the transform function; and modifying the transform function so that vectors corresponding to 2D training images that correspond to images of surfaces that include liquids are close to each other in Euclidean terms and far from vectors corresponding to 2D training images that correspond to images of surfaces without liquids in Euclidean terms.

Example 20

The method of one of examples 17 to 19, further including: determining velocity and vibration of the surface with respect to the field of view of the millimeter-wave radar sensor circuit using sensed data of a first virtual channel of the N virtual channels; normalizing sense data of the N virtual channels based on the determined velocity and vibration; and generating the 2D radar image based on the normalized sense data.

Example 21

The method of one of examples 17 to 20, further including: performing a range transform on sense data of each of the N virtual channels to generate N corresponding range vectors, where each of the N range vectors includes M range bins, where M is an integer number greater than one; and generating a set of beamspace vectors, where each vector of the set of beamspace vectors corresponds to a respective range bin of the N corresponding range vectors in azimuth, and where each vector of the set of beamspace vectors includes L cells, where L is larger than N.

Example 22

The method of one of examples 17 to 21, where generating the set of beamspace vectors is only performed for range bins with identified objects during performing the range transform.

Example 23

The method of one of examples 17 to 22, where the liquid includes water or urine.

Example 24

A vacuum cleaner robot including: a millimeter-wave radar sensor circuit configured to generate N virtual channels of sensed data, where N is an integer number greater than one; and a processor configured to: generate a 2D radar image of a surface in a field of view of the millimeter-wave radar sensor circuit based on sensed data from the N virtual channels of sensed data, where the 2D radar image includes azimuth and range information, generate a multi-dimensional data structure based on the 2D radar image using a transform function, compare the multi-dimensional data structure with a reference multi-dimensional data structure, and determine whether liquid is present in the field of view of the millimeter-wave radar sensor circuit based on comparing the multi-dimensional data structure with the reference multi-dimensional data structure.

Example 25

The vacuum cleaner robot of example 24, where a velocity of the vacuum cleaner robot is 0 mm/s.

Example 26

The vacuum cleaner robot of one of examples 24 or 25, further including a second millimeter-wave radar sensor circuit having a second field of view.

Example 27

The vacuum cleaner robot of one of examples 24 to 26, where the second field of view partially overlaps with the field of view of the millimeter-wave radar sensor circuit.

Example 28

The vacuum cleaner robot of one of examples 24 to 27, where multi-dimensional data structures generated by the processor and corresponding to surfaces having a liquid are close to each other in Euclidean terms and far, in Euclidean terms, from multi-dimensional data structures generated by the processor and corresponding to surfaces without a liquid.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A device comprising:
    a millimeter-wave radar sensor circuit configured to generate N virtual channels of sensed data, wherein N is an integer number greater than one; and
    a processor configured to:
        generate a 2D radar image of a surface in a field of view of the millimeter-wave radar sensor circuit based on sensed data from the N virtual channels of sensed data, wherein the 2D radar image comprises azimuth and range information,
        generate a multi-dimensional data structure based on the 2D radar image using a transform function,
        compare the multi-dimensional data structure with a reference multi-dimensional data structure, and
        determine whether liquid is present in the field of view of the millimeter-wave radar sensor circuit based on comparing the multi-dimensional data structure with the reference multi-dimensional data structure.

2. The device of claim 1, wherein multi-dimensional data structures generated by the processor and corresponding to surfaces having a liquid are close to each other in Euclidean terms and far, in Euclidean terms, from multi-dimensional data structures generated by the processor and corresponding to surfaces without a liquid.

3. The device of claim 1, wherein the device is mounted on a moving vehicle.

4. The device of claim 3, wherein the moving vehicle is a vacuum cleaner robot.

5. The device of claim 1, wherein the surface is a surface of a conveyor belt.

6. The device of claim 1, wherein the millimeter-wave radar sensor circuit comprises two transmitters and two receivers.

7. The device of claim 6, wherein the two transmitters and two receivers have a symmetrical linear arrangement with a vertical offset between the two transmitters and the two receivers.

8. The device of claim 6, wherein the two transmitters and two receivers generate four virtual channels of sensed data.

9. The device of claim 1, wherein the processor is further configured to:
- determine velocity and vibration of the surface with respect to the field of view of the millimeter-wave radar sensor circuit using sensed data of a first virtual channel of the N virtual channels;
- normalize sense data of the N virtual channels based on the determined velocity and vibration; and
- generate the 2D radar image based on the normalized sense data.

10. The device of claim 1, wherein the processor is further configured to generate the 2D radar image by:
- performing a range transform on each of the N virtual channels of sensed data to generate N corresponding range vectors, wherein each of the N range vectors comprises M range bins, wherein M is an integer number greater than one; and
- generating a set of beamspace vectors, wherein each vector of the set of beamspace vectors corresponds to a respective range bin of the N corresponding range vectors in azimuth, and wherein each vector of the set of beamspace vectors comprises L cells, wherein L is larger than N.

11. The device of claim 10, wherein performing the range transform comprises performing a range Fast Fourier Transform (FFT).

12. The device of claim 10, wherein N is 5, M is 32, and L is 121.

13. The device of claim 1, wherein the millimeter-wave radar sensor circuit comprises a transparent enclosure having transmitter and receiver elements, wherein the field of view is orthogonal to a first axis, and wherein the first axis and an axis parallel to a surface of the transparent enclosure has a first angle between 25° and 40°.

14. The device of claim 1, wherein the transform function is generated using embedding.

15. The device of claim 1, wherein the reference multi-dimensional data structure is generated using an embedding deep neural network.

16. The device of claim 1, wherein the liquid comprises water.

17. A method for detecting a liquid from a moving vehicle, the method comprising:
- generating a 2D radar image of a surface in a field of view of a millimeter-wave radar sensor circuit based on sensed data from N virtual channels generated by the millimeter-wave radar sensor circuit;
- generating a multi-dimensional data structure based on the 2D radar image using a transform function;
- comparing the multi-dimensional data structure with a reference multi-dimensional data structure; and
- determining whether liquid is present in the field of view of the millimeter-wave radar sensor circuit based on comparing the multi-dimensional data structure with the reference multi-dimensional data structure.

18. The method of claim 17, wherein multi-dimensional data structures corresponding to surfaces having a liquid are close to each other in Euclidean terms and far, in Euclidean terms, from multi-dimensional data structures corresponding to surfaces without a liquid.

19. The method of claim 18, wherein the multi-dimensional data structure comprises a vector and the reference multi-dimensional data structure comprises a reference vector, the method further comprising generating the transform function by:
- analyzing a set of 2D training images, wherein a first subset of 2D training images of the set of 2D training images correspond to images of surfaces including liquids and a second subset of 2D training images of the set of 2D training images correspond to images of surfaces without liquids; and
- generating sets of training vectors that correspond to respective 2D training images based on analyzing the set of 2D training images by using the transform function; and
- modifying the transform function so that vectors corresponding to 2D training images that correspond to images of surfaces that include liquids are close to each other in Euclidean terms and far from vectors corresponding to 2D training images that correspond to images of surfaces without liquids in Euclidean terms.

20. The method of claim 17, further comprising:
- determining velocity and vibration of the surface with respect to the field of view of the millimeter-wave radar sensor circuit using sensed data of a first virtual channel of the N virtual channels;
- normalizing sense data of the N virtual channels based on the determined velocity and vibration; and
- generating the 2D radar image based on the normalized sense data.

21. The method of claim 17, further comprising:
- performing a range transform on sense data of each of the N virtual channels to generate N corresponding range vectors, wherein each of the N range vectors comprises M range bins, wherein M is an integer number greater than one; and
- generating a set of beamspace vectors, wherein each vector of the set of beamspace vectors corresponds to a respective range bin of the N corresponding range vectors in azimuth, and wherein each vector of the set of beamspace vectors comprises L cells, wherein L is larger than N.

22. The method of claim 21, wherein generating the set of beamspace vectors is only performed for range bins with identified objects during performing the range transform.

23. The method of claim 17, wherein the liquid comprises water or urine.

24. A vacuum cleaner robot comprising:
- a millimeter-wave radar sensor circuit configured to generate N virtual channels of sensed data, wherein N is an integer number greater than one; and
- a processor configured to:
  - generate a 2D radar image of a surface in a field of view of the millimeter-wave radar sensor circuit based on sensed data from the N virtual channels of sensed data, wherein the 2D radar image comprises azimuth and range information,
  - generate a multi-dimensional data structure based on the 2D radar image using a transform function,
  - compare the multi-dimensional data structure with a reference multi-dimensional data structure, and determine whether liquid is present in the field of view of the millimeter-wave radar sensor circuit based on comparing the multi-dimensional data structure with the reference multi-dimensional data structure.

25. The vacuum cleaner robot of claim 24, wherein a velocity of the vacuum cleaner robot is 0 mm/s.

26. The vacuum cleaner robot of claim 24, further comprising a second millimeter-wave radar sensor circuit having a second field of view.

27. The vacuum cleaner robot of claim 26, wherein the second field of view partially overlaps with the field of view of the millimeter-wave radar sensor circuit.

28. The vacuum cleaner robot of claim 24, wherein multi-dimensional data structures generated by the processor and corresponding to surfaces having a liquid are close to each other in Euclidean terms and far, in Euclidean terms, from multi-dimensional data structures generated by the processor and corresponding to surfaces without a liquid.

* * * * *